United States Patent
Khalil et al.

(10) Patent No.: US 11,182,787 B2
(45) Date of Patent: Nov. 23, 2021

(54) SYSTEM AND METHOD FOR SCALING BLOCKCHAIN NETWORKS WITH SECURE OFF-CHAIN PAYMENT HUBS

(71) Applicants: Ramy Abdelmageed Ebrahim Khalil, Zug (CH); Arthur Gervais, Zug (CH)

(72) Inventors: Ramy Abdelmageed Ebrahim Khalil, Zug (CH); Arthur Gervais, Zug (CH)

(73) Assignee: LIQUIDCHAIN AG, Zug (CH)

( * ) Notice: Subject to any disclaimer, the term of this patent is extended or adjusted under 35 U.S.C. 154(b) by 227 days.

(21) Appl. No.: 16/183,709

(22) Filed: Nov. 7, 2018

(65) Prior Publication Data
US 2019/0139037 A1 May 9, 2019

Related U.S. Application Data

(60) Provisional application No. 62/582,830, filed on Nov. 7, 2017.

(51) Int. Cl.
| | | |
|---|---|---|
| *G06Q 20/38* | (2012.01) | |
| *H04L 9/06* | (2006.01) | |
| *H04L 9/32* | (2006.01) | |
| *G06Q 20/02* | (2012.01) | |
| *G06Q 20/40* | (2012.01) | |
| *G06Q 20/06* | (2012.01) | |
| *G06F 16/23* | (2019.01) | |
| *H04L 29/06* | (2006.01) | |
| *G06Q 20/04* | (2012.01) | |

(52) U.S. Cl.
CPC ....... *G06Q 20/389* (2013.01); *G06F 16/2379* (2019.01); *G06Q 20/027* (2013.01); *G06Q 20/047* (2020.05); *G06Q 20/0655* (2013.01); *G06Q 20/3825* (2013.01); *G06Q 20/40* (2013.01); *H04L 9/0637* (2013.01); *H04L 9/3218* (2013.01); *H04L 9/3239* (2013.01); *H04L 9/3247* (2013.01); *H04L 63/00* (2013.01); *G06Q 2220/00* (2013.01); *H04L 2209/38* (2013.01); *H04L 2209/56* (2013.01)

(58) Field of Classification Search
CPC .. G06Q 20/389; G06Q 20/047; G06Q 20/027; G06Q 20/0655; G06Q 20/3825; G06Q 20/40; G06Q 2220/00; G06F 16/2379; H04L 9/0637; H04L 9/3218; H04L 9/3239; H04L 9/3247; H04L 63/00; H04L 2209/38; H04L 2209/56
USPC .......................................................... 705/76
See application file for complete search history.

(56) References Cited

U.S. PATENT DOCUMENTS

| | | | |
|---|---|---|---|
| 9,825,931 B2 * | 11/2017 | Johnsrud | H04L 9/3242 |
| 2016/0330034 A1 * | 11/2016 | Back | H04L 9/3255 |
| 2017/0132621 A1 * | 5/2017 | Miller | G06Q 20/065 |

(Continued)

*Primary Examiner* — James D Nigh
(74) *Attorney, Agent, or Firm* — Wuersch & Gering LLP

(57) ABSTRACT

A system, method, method for manufacturing, apparatus, and computer-readable and executable product and program code having an off-chain payment hub. Dynamic payments and signatures can be effected. Multiple smart contract payment hubs are interconnected with efficient transmission routes. Off-chain payment enactment fees can be nullified at no security cost. Registration with a payment hub server comes at no on-chain cost for a user. Collateral costs for trustless operation are marginally reduced to that covering at a fixed time period of operation rather than the whole lifespan of operation.

30 Claims, 14 Drawing Sheets

(56) References Cited

U.S. PATENT DOCUMENTS

| | | | |
|---|---|---|---|
| 2018/0025435 A1* | 1/2018 | Karame | H04L 9/3236 |
| | | | 705/30 |
| 2018/0268401 A1* | 9/2018 | Ortiz | G06Q 20/204 |
| 2019/0081793 A1* | 3/2019 | Martino | G06Q 20/065 |
| 2019/0122317 A1* | 4/2019 | Hunn | H04L 9/0637 |
| 2020/0137082 A1* | 4/2020 | Jimenez-Delgado | |
| | | | H04L 9/3239 |
| 2020/0234386 A1* | 7/2020 | Blackman | H04L 9/0894 |

* cited by examiner

SYSTEM AND METHOD FOR SCALING BLOCKCHAIN NETWORKS WITH SECURE OFF-CHAIN PAYMENT HUBS

CROSS-REFERENCE TO RELATED APPLICATIONS

This application claims priority to U.S. Provisional Patent Application No. 62/582,830, filed on Nov. 7, 2017, which is herein incorporated by reference in its entirety.

FIELD OF INVENTION

The present invention relates to a system, method, method for manufacturing, apparatus, and computer-readable and executable product and program code having an off-chain payment hub.

RELATED INFORMATION

Early payment systems involving two or more parties, often included at least one trusted intermediary to handle the exchange of goods and or money between the two or more parties. Blockchain systems arrived, effective providing an electronic payment solution that solved the double-spending problem. The double-spending problem is essentially the duplication of currency. While duplication of a paper U.S. bill is possible, it is not altogether easy to effect. In the digital world, making a digital copy of a digital currency can be all too easy; hence, the advent of digital systems which allow a system to verify whether a digital coin has already been spent by a peer. Thus, blockchain systems such as Ethereum or Bitcoin provide an append-only ledger that records the history of all transactions exchanged among the peers.

Permissionless blockchains such as Ethereum or Bitcoin, allow for any participant to join and/or leave the network at any time. Such permissionless blockchains provide a decentralized system that exists between all permitted parties, thus eliminating the need for a trusted third party such as a bank (i.e., a middleman), and provide a fast, cheap, and secure system for transfer of monetary value, or even the execution of smart contracts. Such permissionless blockchain is a decentralized database represented as a chain of blocks or records where each block points to its predecessor in the chain. In practice, the Ethereum extended the Bitcoin transaction language to a Turing complete programming language in order to ease the development of smart contracts.

The Ethereum blockchain systems, for example, are also used for the execution of smart contracts—which provides an easier way to understand how this blockchain functions. Smart contracts, or self-executing contracts, are converted to computer code, stored and replicated on the blockchain system, supervised only by the network of computers running that blockchain. Essentially, an asset or currency is transferred into program code, and when the program runs that code and validates a condition, then according to what the code states, and asset is automatically provided to an entity. For example, a contract states that upon payment of $1000 by entity Y, then product X will be shipped by entity Z to entity Y. Creating a smart contract means that this contract and its conditions are converted to computer code, and upon the system seeing a cryptocurrency payment of $1000 or other type of payment, then the product X is ordered shipped as contracted. In order to keep the automation, it helps if the assets and monetary values are codable. Whether for monetary purposes or smart contracts, blockchain provides a secure, accessible digital version for all parties involved in the chain and automates many of the previously manual tasks.

Significant problems with the Ethereum and Bitcoin decentralized permissionless blockchains include performance and scalability. For example, Bitcoin supports only up to 7 transactions per second, which in not sufficient for a scalable payment system. Other systems have attempted alleviate this restriction by conducting a simple re-parameterization of permissionless blockchains, supporting only up to approximately 100 transactions per second. Such re-parameterization of key blockchain parameters such as block interval or block size, has been shown to not allow a transaction load beyond 100 transactions per second. Other systems have found ways to support beyond the 100 transactions per second, but require different or additional trust assumptions or improving the underlying consensus algorithm to support more transactions or provide second layer payment channels. Another alternative for improving scalability may be to develop off-chain solutions, thus oftentimes avoiding needing the scarce resources of the blockchain. The existing systems also suffer the problem that every peer needs to be aware of all transactions of other peers to not be vulnerable to double-spending.

For example, Bitcoin provided an open and decentralized blockchain, and many alternative follow up blockchains such as Ethereum have emerged since then allowing for improved transactions through smart contracts. Other alternatives such as zcash and Monero, based upon Bitcoin, attempt to enhance transaction privacy. However, with the emergence of smart contracts and more expressive transaction languages, it has been demonstrated that smart contracts have severe security vulnerabilities causing smart contract developers to consider security enhancements of having developers verify their code. It is contemplated that one can add Schnorr signatures to the Bitcoin system, to allow for the possible aggregation of multiple signatures into one which is verifiable against an aggregate of the relevant public keys in a single step.

For example, several off-chain payment solutions have been proposed. These off-chain payment solutions can be divided into two categories: (1) those that rely on blockchain based time locks, where the channel starts with a commitment transaction which, for example, lasts for 10 days; and, the subsequent commitment transaction then lasts 9 days, and can thus be spent before the first transaction; and (2) those payment channels that rely on punishment, i.e. if one party misbehaves, the other party can claim all funds of the channel. Such payment channels are still in early development, and include such proposals as minimizing the worst-case collateral costs of indirect off-chain payments; optimizing the search process of finding a payment route; providing different constructions that allow for privacy preserving off-chain payment channels; and a Bitcoin-based system that supports micropayment channels.

Payment channels allow establishment of direct peer-to-peer payment channels between two parties. Those two parties can privately maintain and update a two-party ledger. In such a system, the individual transactions are not required to be written to the blockchain, and at the same time, the payment channel guarantees that the participants can only spend their rightful amounts and that the payment channel state can be written to the global blockchain ledger at any time. Because payment channels avoid transacting on the blockchain, the payment channels in practice can significantly improve the transaction throughput. The transaction rate is effectively only limited by the network bandwidth because the participating peers. Payment channels also do not require the direct service of the blockchain miners and the payment channels can therefore perform transactions with lower transaction fees and consequently allow to economically perform micropayments.

The use of payment channels has some limitations, but overall still improves the transaction throughput of a decentralized ledger to a network bandwidth of the two peers participating in the payment channel.

In industry, digital ledgers such as blockchain have been used to provide a secure method of making and recording transactions, agreements, and contracts. That is, blockchain can be used to secure anything that needs to be recorded and verified as having occurred. Blockchain simply described is a database shared across a network of servers/computers, and the ledger itself is a list of transactions that have occurred since its inception. A blockchain database consists of blocks and transactions. The blocks include batches of transactions which are hashed and encoded, each block including the hash of the block preceding it in the chain. This process essentially validates each block and provides database security. When a transaction occurs, the details of the transaction are encrypted and a unique multiple-character transaction number is generated. This unique multiple-character transaction number generated is recorded in the digital ledger as a placeholder. Users of a network can see that the transaction has occurred, but only the actual participants involved in the transaction can access and view the details of the transaction. Advantageously, this structure necessitates that an external malicious user would need to have simultaneous access to every computer/server that holds a copy of the blockchain database in order to tamper with the blockchain database.

In a tradition blockchain system, e.g., as shown in FIG. 1A, a block 100 includes data 101 (e.g., information regarding sender, receiver, number of coins, et al.), a hash 102 (i.e., fingerprint identifying the block and contents), and the hash of the previous block 103 in the chain. As shown in FIG. 1B, each block 111, 112, 113 is cryptographically linked to the previous block in the blockchain 110, effectively forming a chain of blocks 110. If the block is changed (e.g., data is updated for a new sender), then the hash changes and this has a ripple effect or chain reaction on all of the following blocks thereafter since the hash of this block is no longer the hash stored in the following block. However, because computers are fast, some used the computer to immediately regenerate new hashes for the following blocks in order to have a working blockchain, in spite of the change. Accordingly, Proof of Work was developed to prevent users from circumventing the system. The Proof of Work solution implemented an automatic delay in processing for the blocks and provided a distributed system in which all users involved in the specific blockchain are sent the new block and all must approve before it is entered.

For example, any Ethereum user can write and publish a smart contract, then other users can execute the smart contract that is recorded in a block which is appended to the blockchain. Note that all information in the blockchain is publicly available. To execute a contract, a user submits an Ethereum transaction containing all information required to process the contract. A miner can process the user transaction and commit it by writing this transaction to a new block (possibly along with other transactions). A valid block needs to be appended to the latest block of the blockchain, for example. A transaction is considered completed, when it has been added in a block. For security purposes, users should wait for several block confirmations (i.e., several additional blocks after the block containing the transaction), before considering a transaction to be final.

For example, Bitcoin transactions are sent from an address to another address. An address is a unique identifier (hash) of a public key, and, only the owner of the corresponding private key is eligible to sign a transaction involving transfer of monetary funds. Bitcoin transactions are evaluated with a stack-based programming language (i.e., Script). However, Script only supports a limited instruction set. This lack of a high-level programming language encouraged the development of more intuitive and expressible languages, such as Ethereum whose cryptocurrency is called ether, and supports two kinds of addresses: (i) externally owned addresses (e.g., owned by a user) and (ii) contract owned addresses.

To avoid denial-of-service attacks, transactions are required to pay a fee for their execution. In Bitcoin, each transaction can pay a transaction fee, while in Ethereum, a transaction pays gas (also to execute contracts).

The majority of existing blockchains rely on the Proof of Work mechanism, but it is unfortunately a computationally-expensive puzzle that is solved by miners to find a block. Each block is cryptographically liked to the previous block in the blockchain, forming a chain of blocks. It has been shown that as long as the majority of the blockchain miners are honest, an attacker is very unlikely to alter the blockchain history. The Bitcoin system provides for the ability to trade monetary value, and enables to provide an electronic solution to trade other commodities, such as physical products or domain names.

Payment channel networks also allow performance of payments between parties that are not immediately connected by a payment channel. These linked payments utilize a chain of payment channels as intermediate links between two parties that wish to transact with each other off-chain, without having to open a new payment channel or conduct an on-chain transaction. Various systems have provided performance improvements for payment networks, including by addressing the worst-case completion time of an off-chain linked-transaction, routing strategies that optimize the amount of time taken on average to find a payment route, and a rebalancing of payment channel funds without on-chain transactions.

Payment channel networks have at least four fundamental flaws, including: i) they rely on complex routing topologies which need to be set up and maintained; ii) funds allocated to a payment channel are typically bound between two parties and can only be transferred further over fee contingent routes, iii) current linked payment channels provide limited privacy guarantees, and iv) current payment channels require always-online observers to deter potential misbehavior of the involved parties.

Accordingly, there exists a need for a more scalable, improved performance blockchain network for payments. In addition, there exists a need for increased privacy, confidentiality, and audibility of the transaction. Accordingly, embodiments of the present invention provide a system, method, and computer-readable and executable product, which can allow thousands of participants to securely transact over a single payment hub, the allocated funds of the participants being useable freely among the members of the single payment hub. Accordingly, embodiments of the present invention provide for an off-chain solution which allows an alleviation of the burden of the underlying blockchain.

SUMMARY

Embodiments of the present invention provide for a system, method, and computer-readable and executable product and program code having an off-chain payment hub, embodiments of which are herein referred to sometimes as "Liquidity.Network" branded system. In an embodiment, a payment hub construction for off-chain payments that scales from two-party to n-party off-chain payment channels, without requiring additional locked up funds per additional user, is provided. Embodiments of the present invention provide a novel commitment scheme to account for one or more entities' or users' respective balances. Entity and user are used interchangeably in the various embodiments herein.

Embodiments of the present invention provide for allocated funds of a user within a payment hub can be used to pay any other member of the payment hub. This can significantly reduce the routing and network complexity of existing payment channel designs. In an embodiment, several participants can securely transact over a single payment hub, and allocated funds can be used freely among the members of the hub. A user of a payment hub can request withdrawal of his/her funds instantly and securely.

Embodiments of the present invention provide for a hub structure which alleviates the burden on the network to route payments, which multiple hubs can be interconnected over traditional payment channels. A payment hub provides better privacy guarantees than traditional payment channels because payments done through the hub are effectively anonymized among the set of members of the payment hub. The user of a payment hub does not require an always-online observer to deter potential hub misbehavior. This significantly reduces the operating costs of hub payment channels. In embodiments, the system of the present invention is built by both interlinking multiple payment hubs that can rebalance their funds off-chain with the REVIVE protocol and by interlinking multiple hubs directly which allows to exponentially grow the scalability properties of the Liquidity-Network™ brand system. In the embodiment where multiple payment hubs are interconnected directly, one hub essentially becomes a user of another hub. Further, the interconnection between the payment hubs is assisted with the support of off-chain rebalancing.

Embodiments of the present invention provide for an increased resilience of a payment hub operation, the hub operating within a trusted execution environment.

Embodiments of the present invention provide for an off-chain payment hub. In practical applications, to establish a payment channel between two entities, initial deposits representing the total amounts that can be transacted in this channel are put on the blockchain in escrow. The security lies in the assurance that in case of a dispute of payment or a need to withdraw deposits, the latest state of the ledger that the parties have agreed upon can be submitted to the blockchain and each party can claim its rightful balance of the deposits. For a payment network, instead of having to open payment channels between every pair of individuals that wish to make off-chain payments to each other, a linked-payment which utilized a network of payment channels to find an indirect path from the sender to the receiver can be used. Such payment networks are envisioned to improve the usability and practicality of payment channels.

Finding routes over a payment network can be considered similar to Internet packet routing. Certain specific routing restrictions apply in this case. Intermediate nodes that route the linked payment need to have a sufficient balance in the payment channel that will act as the outgoing edge for the payment. A routed payment either automatically succeeds or fails. The individual payments along each channel need to all be bound together, such that they all succeed or fail, and no one loses any money. Because intermediate nodes are typically not involved in the payment between the sender and the receiver, they need to be incentivized to forward a payment. Current designs allow for intermediate hops to collect fees for forwarding a payment.

Existing designs for payment networks include systems which support routed payments that can be confirmed without any block-confirmation delay, systems which provide the ability to make off-chain transactions with any token that follows the standard token API, and systems in which when performing a linked payment, the amount of money that is to be transacted has to be frozen across the entire chain of payment channels involved until the transaction completes or terminates. Other systems allow for probabilistic micropayments where the recipient does not necessarily need to have deposited funds in escrow. These existing designs have several fundamental disadvantages, including that payment channels require collateral to be locked up for every channel, existing payment channels may not be refilled off-chain, and routing complexity. For example, for traditional payment channels which require that collateral is locked up for every channel, this effectively locks up a substantial amount of funds that cannot be used directly with other nodes in the network. Routing payments can alleviate this, but still limits the available funds to a particular set of routes.

In contrast, embodiments of the present invention allow for any member of a payment hub to pay any other member of a payment hub with the allocated funds, instead of limited the available funds to a particular set of routes. Further, existing payment channels do not provide for refilling off-chain. Embodiments of the present invention allow for implementation of REVIVE opensource to allow refunding payment channels off-chain, avoiding degradation of payment channels without costly on-chain transactions and increasing scalability. Routing complexity is one of the biggest hurdles of present-day off-chain scaling solutions such as Lightning and Raiden systems. In embodiments of the present invention, due to its hub network structure, embodiments of the present invention requires significantly less routing, while still benefitting from a decentralized nature. In embodiments of the present invention, multiple hubs can be interconnected with efficient routes for decentralization and redundancy purposes.

Several off-chain payment solutions have been previously proposed and are essentially either the type that relies on blockchain based time locks or on punishment. Time locks are when a channel starts with a commitment transaction which lasts, e.g., for 10 days. The subsequent commitment transaction will then last 9 days, and can thus be spent before the first transaction. Punishment is when one party misbehaves, then the other party can claim all funds of the payment channel.

In embodiments of the present invention, a method, system, and/or programmable instructions provide for secure off-chain digital transactions, including: deploying a smart contract from an originating source to a first off-chain ledger associated with a first payment hub server; authorizing at least one user to interact with the first payment hub server; and synchronizing periodically a balance sheet of the first off-chain ledger with the smart contract using a cryptographic commitment structure, wherein the smart contact is used to authorize a withdrawal from the first off-chain ledger. In embodiments of the present invention, an off-chain transaction is enacted, the transaction authorization is signed and sent to the payment hub server directly. In embodiments of the present invention, a blockchain payment address is authorized for a deposit. In embodiments of the present invention, if interacting directly with the payment hub server, the blockchain payment address is obtained and info submitted to the smart contract to commence a withdrawal, wherein info is proof of sufficient balance to cover the amount indicated in the transaction. In embodiments of the present invention, the deploying of the smart contract is effected as a broadcast. In embodiments of the present invention, the smart contract includes a signature of the originator. In embodiments of the present invention, upon completion of the transaction, all signatures obtained are provided on the smart document. In embodiments of the present invention, a cryptographic commitment structure is employed to provide secure proofs of correct transaction enactment and balance updates. In embodiments of the present invention, the transcripts that provide efficient proof to the system that the hub is operating correctly. In embodiments of the present invention, the user(s)' device(s) require access to their account(s)' proofs to verify them. Thus, both the user(s) and the internal system are required to see the proofs. In embodiments of the present invention, allowing open access to all data and proofs, or user(s) selectively allowing access by third parties, can occur.

DETAILED DESCRIPTION

In embodiments of the present invention, blockchain is generally considered as a protected and immutable root of trust that comprises a decentralized database including a global view of accounts, their balances and transactions, and extra associated data. Each account in the ledger is controlled by its own private key, that only the owner of the account should know. A transaction from any account cannot be authorized without possession of its respective private key. Authorized modifications to the ledger are considered to be globally available after a block is generated, on average every predetermined block time T. Due to the characteristic of providing an average block time T, a blockchain can also be viewed as a timestamping service. In the following sections, we denote as an era, the time that corresponds to one average block time.

In addition to ledger transactions that transfer balance from one account to another, embodiments of the present invention include a smart contract execution environment such as that found in Ethereum. As discussed herein, Ethereum's smart contracts are allowed to hold a balance in the ledger, and control it according to their code. In an embodiment, once a smart contract is published, it cannot be modified, nor can a result outside the bounds of its correct execution be accepted on the global ledger.

In embodiments of the present invention, a system and method are adapted to pre-existing off-chain payment network solutions, extending those same solutions with a safe rebalancing approach. An embodiment of the present invention includes an off-chain payment solution that allows a pair of peers to keep track of their own two-way ledgers off-chain. This off-chain ledger is assumed to be pegged to an on-chain smart contract that requires an initial funding from the two peers. The contract is assumed to only allow peers to withdraw balances that they have bother agreed on using their signatures. The sum of the two off-chain balances may not exceed the total deposit in the o-chain contract at any given time.

In embodiments of the present invention, for purposes of the rebalancing embodiment, an underlying communication network is assumed, where all participants can communicate directly off-chain (e.g., via TCP (Transmission Control Protocol) connection). Given that the participants had previously established off-chain payment channels, prior to needing to rebalance them, we assume that the line of communication that was used for channel establishment can be reused by our protocol.

In embodiments of the present invention, the payment hub H is comprised of two fundamental building blocks: a smart contract $SC_H$ (referred to as payment hub smart contract) and an online server $S_H$ (referred to as payment hub server). The smart contract operates on any Turing-complete enabled blockchain B, while the online server is any Internet-reachable server. Multiple hubs H can be interconnected in embodiments of the present invention.

Figure 1A:
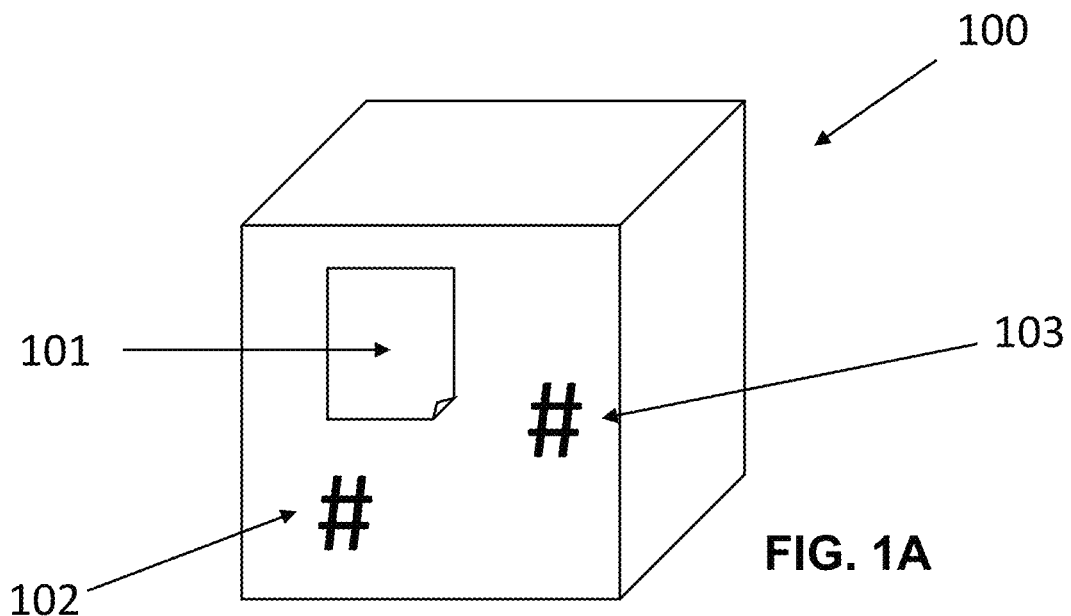
FIG. 1A shows an example embodiment of a block according to the state of the art.
Figure 1B:
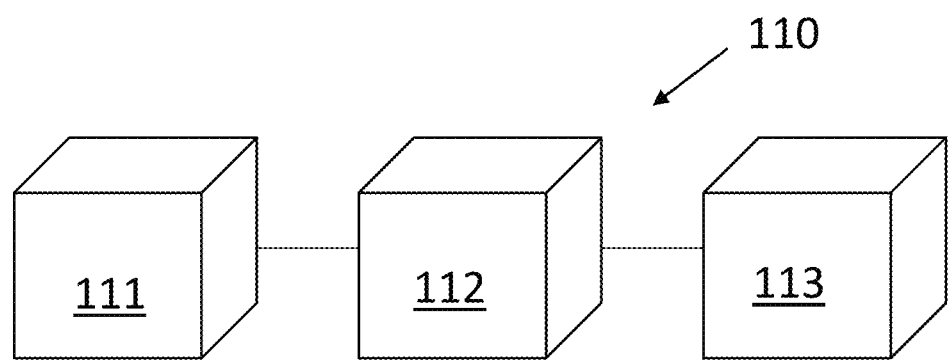
FIG. 1B shows an example embodiment of a blockchain according to the state of the art.
Figure 2:
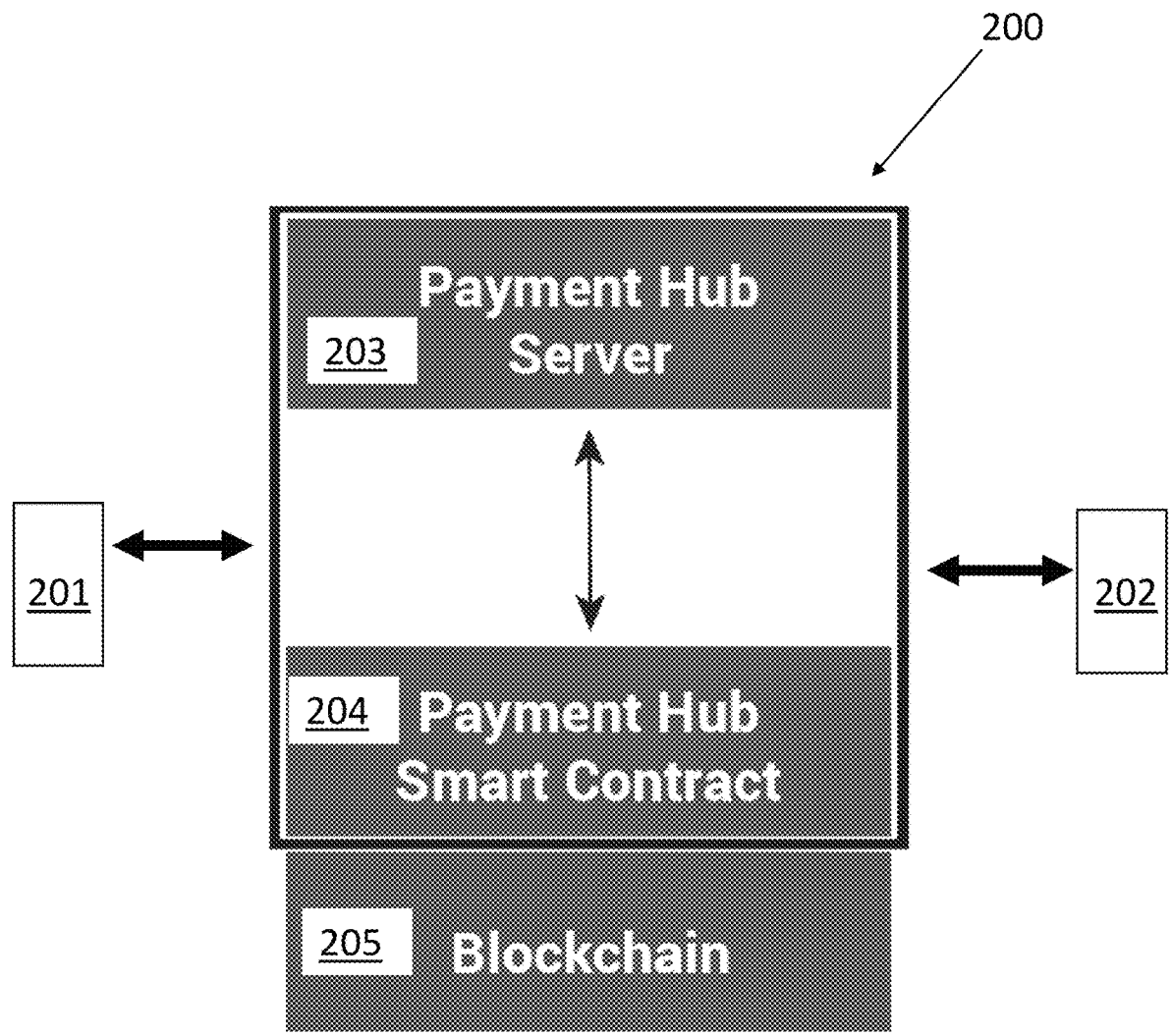
FIG. 2 shows an example embodiment of a payment hub architecture according to the present invention.

FIG. 2 shows an example embodiment of a payment hub architecture 200 having a blockchain 205-based smart contract and an online server. The online server and the smart contract communicate and the users communicate with both the server and the smart contract. FIG. 2 provides a view of the overall system having a first entity 201 and a second entity 202 which communicate with a payment hub server 203, payment hub smart contract 204, and blockchain 205. A first entity and a second entity can be one or more persons, computer processors, et al. Embodiments of the present invention can be executed involving a person user or it can be essentially an automated system, including an artificial intelligence component, that continues to improve and learn based on data stored in the system regarding a specific entity.

In an embodiment, there can be a high level of intuition behind the payment hub protocol; that is, behind the steps performed to transfer a payment off-chain through a payment hub between at least one entity to at least one other entity.

Figure 3:
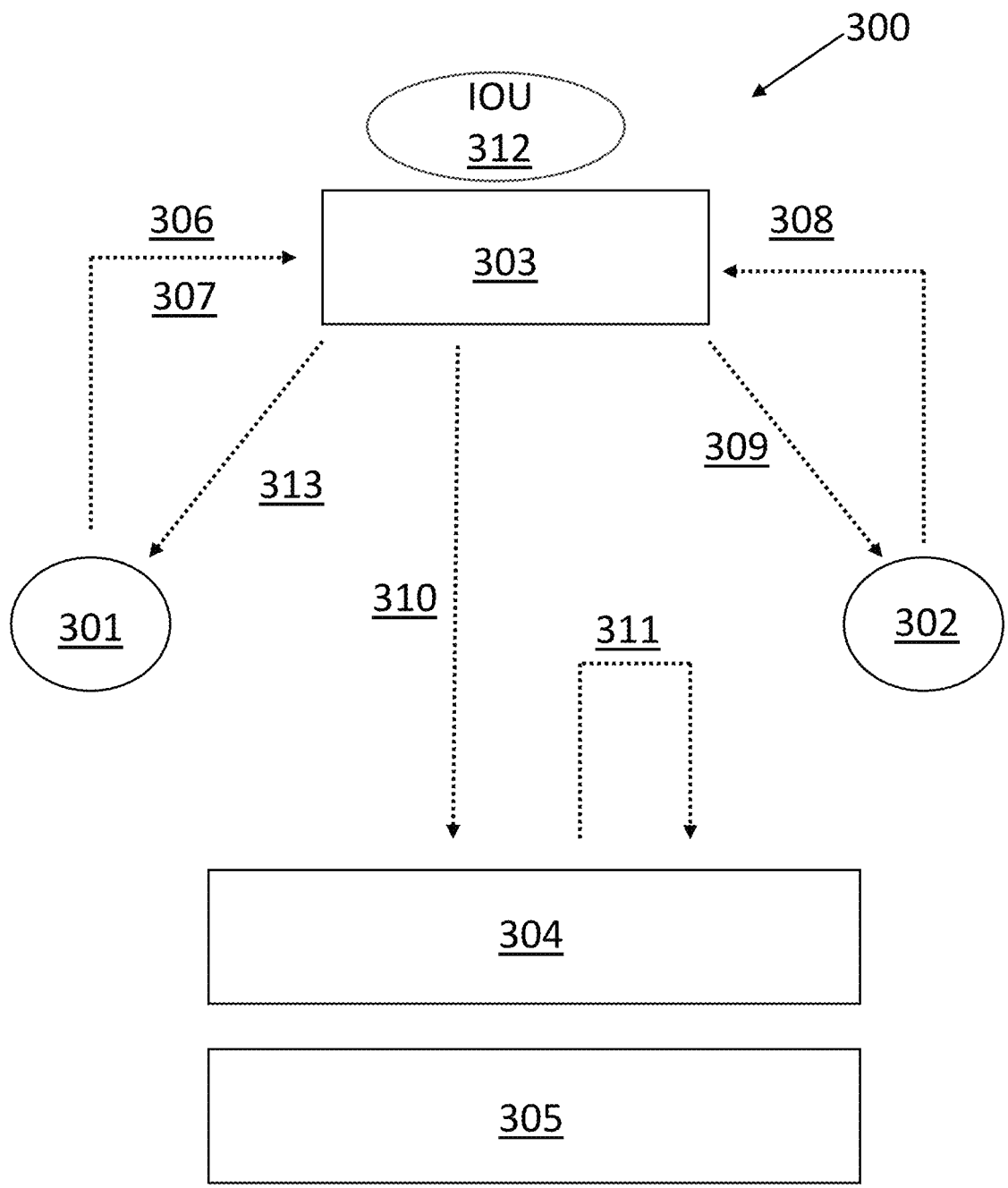
FIG. 3 shows an example embodiment of a system according to the present invention.

For example, in an embodiment shown in FIG. 3, a series of steps are executed by Entity-B 301 of a payment hub to transfer a payment off-chain to an Entity-A 302. In this embodiment, it is assumed that both Entity-A 302 and Entity-B 301 each have or own one unit of cryptocurrency (e.g., Ether) on the blockchain B. For example, cryptocurrency can be Ether as in the Ethereum system. This embodiment involves one payment hub 304, but the system can have multiple payment hubs or a network of payment hubs. The following steps then occur:

Entity-B 301 and Entity-A 302 choose to work with the payment hub H 304. Both entities deposit one Ether each in the smart contract $SC_H$ 304. This enables each of the entities to send or cause to send a total of one Ether to another entity participant of the payment hub H 304. This assumes that there are no "gas" costs and no fees paid to the payment hub. That is, these administrative costs are required to combat denial of service attacks in blockchains. In embodiments of the present invention, such administrative costs are not a security requirement for off-chain payments. That is, administrative or operational costs can be made optional, and thus not required for "correct" system operation.

In embodiments of the present invention, such administrative costs can be enforced by the payment hub in order to cover operational costs. In embodiments of the present invention, administrative or operational costs can be made required for "correct" system operation.

Entity-B 301 then creates an IOU ("I owe you") 312 from Entity-B 301 to Entity-A 302, providing, for example, 0.1 Ether:

(Entity-B, Entity-A, 0.1).

Entity-B 301 then sends the IOU 312 to the online server $S_H$ 303. The online server $S_H$ 303 then cryptographically signs the IOU 312 and forwards the IOU 312 to Entity-A 302:

IOU(Entity-B, Entity-A, 0.1)$_{sig(hub)}$.

The IOU received by Entity-A is enforceable on-chain if need be. In order to incentivize the online server $S_H$ to forward the IOU, Entity-B provides an additional IOU to the online server $S_H$, paying for example, 0.001 Ether:

IOU(Entity-B, Hub, 0.001), the "0.001" corresponding to a 1% fee.

In embodiments, the IOU can be structured or organized in different ways and still be usable in the present embodiments. In an embodiment, the contents of the IOU described above and herein can be encoded differently, and still be usable by the present embodiments. For example, the contents can be separated into smaller commitment pieces that can be later combined to commit an original set of details. This separating or dividing of the contents can be done in various available methods, and be usable in the present embodiments. In an embodiment, the organization or representation of the contents of an IOU can differ from that described herein and still be usable in the present embodiments. In embodiments, portions of the information are accessed or committed to separately, and then pulled into the same vehicle or system.

At the end of the periodic eon, the online server $S_H$ broadcasts a checkpoint $C_H^{eon}$ 313, 309, 310 which aggregates all of the account balances of all of the users which have transacted over the payment hub's online server $S_H$. The smart contract $SC_H$ receives, validates and applies checkpoint $C_H^{eon}$ to the user balances on-chain. A periodic eon is a repeating time interval at which the payment hub operates.

In an embodiment, a payment hub composed of an online server $S_H$ and a smart contract $SC_H$ is made. In order to account for the balances of each payment hub entity or user in a particular eon, a new Merkle interval tree $T_H^{eon}$ is made. This tree is a Merkle tree, but the leaves are augmented with additional information to store the user balances in a precise, efficient, and secure manner. The sum of all balances of the Merkleized interval tree must be equal to the entire funds stored in the payment hub's smart contract. The Merkleized interval tree is similar to the augmented Merkle tree proposed by others in the field, but used differently and built for a completely different purpose.

The information encoded in the internal nodes and in the leaves is specialized to allow for correct and provably integral operation. The merkle proofs from this tree can be provided to a blockchain smart contract in order to prove the exclusive ownership of a balance allotment by a user in the system, and subsequently prove the correctness of the accounting procedures followed by the hub.

In an embodiment, a human user of the system can see at least a single number displayed showing the total balance, after the full proof has been verified by the user's device. This verification can be the same used presently in available banking apps. In an embodiment, the administrator or entity having access and/or control on the backend or inside the system can have a graphical user interface (GUI) displaying the exclusive allotments and their status, after being machine verified. In an embodiment, manual verification of the allotments and status is not humanly feasible since the proof validation includes complex actions. The system transcripts are coded for the system to read, and not designed for direct human inspection. That is, a visualization of someone's exclusive allotment in a pool can be portrayed as a portion of a pie chart, but that visualization would not provide a transparent display of the underlying complex actions and system findings.

A Merkleized interval tree has a leaf1 of $T_H^{eon}$. The leaf is built as follows: each leaf is an entry of an entity or user that has deposited funds in a smart contract $SC_H$. The structure of the leaf is represented by the following:

$1(i) = <\text{offset}(i), \text{information}(i) + \text{amount}(i)>$, where offset(0) s equal to 0, offset(1) is equal to offset (0)+amount(0). Offset(2) is equal to offset(0)+amount(0)+ amount(1), etc. The offset corresponds to the sum of the balances of all previous users up to user i:

$$\text{offset}(0) = 0$$

$$\text{offset}(i) = \sum_{j \in [0,i]} \text{amount}(j)$$

Where information(i) includes a cryptographic hash of the blockchain address and the Merkle root of the transaction history from the previous eon. For example, information(i)= {address(i), signed Merkle root of outgoing log(i), signed Merkle root of incoming log(i)}, where log(i) represents the log of transactions of entity i or user i. The rightmost element of 1 is the current offset plus the amount of stake that the user owns in the payment hub.

In an embodiment, abuse of the system might happen by an entity creating $T_H^{eon}$, for example, by merging two neighboring accounts into one account. In order to avoid such abuse. The positions of each user or entity must be enforced.

In an embodiment, a proof of stake of a single user or entity can be verified at any point by requesting the unique path of interval tree $T_H^{eon}$. For example, if a user identification or id is 7 (with the index starting at 0), and $T_H^{eon}$ has 8 participants, then user 7 only requires the rightmost path of $T_H^{eon}$ to verify the user 7's stake. The proof of each user is of the same size, irrespective of the number of users in a payment hub. This ensures fairness among the participants of the payment hub.

In an embodiment, a checkpoint $C_H^{eon}$ aggregates the off-chain transactions that have been operated over $S_H$. Checkpoints are created for each eon of the protocol. A checkpoint $C_H^{eon}$ is defined as the root hash of the Merkleized interval tree $T_H^{eon}$.

In embodiments herein, era denotes the time interval for one block of blockchain B. An eon is the time interval at which $S_H$ operates and submits a $C_H^{eon}$ to $SC_H$. An eon also corresponds to the time interval at which $S_H$ aggregates all the off-chain payments that have been performed over $S_H$. An epoch is one quarter of an eon. Accordingly, throughout this application, references may be made to the smart contract epochs, smart contract eons, and smart contracts eras.

In an embodiment, a payment hub user can challenge $S_H$ anytime to claim fraudulent behavior. This is called a challenge. A challenge is composed of on-chain and off-chain elements, including: (i) the initial state round and balance (the balance which is already confirmed on-chain), and (ii) the off-chain balance that has been agreed upon with off-chain transactions.

In an embodiment, a challenge may be initiated using at least one of the aforementioned pieces of information, depending upon the state of the off-chain ledger. For example, if the user held a balance in the previous eon, then the initial state round and balance is to be included. If the user performed or received off-chain transfers in the previous eon, then the off-chain balance that has been agreed upon with off-chain transactions is effected. If no interactions, or no balance is held within the payment hub, then there is nothing to be challenged, and thus, no data (e.g., no initial state balance and no off-chain balance agreed upon in an off-chain transaction) present to initiate one.

In an embodiment, other unique payment hub features are possible. For example, in an embodiment, an instant withdrawal feature is provided which allows a payment hub user to withdraw the funds of the $SC_H$ directly, that is, at the speed of at least one era. An embodiment of an instant withdrawal by Entity-A, can include one or more of the following steps. First, Entity-A creates an IOU, without signatures, and requests the current payment hub $S_H$'s signature on the IOU. Next, Entity-A submits the IOU, with only online server $S_H$'s signature on the IOU, to a second smart contract with a separate collateral pool, which reserves the funds for withdrawal until a certain timeout period. Entity-A then signs the IOU and submits the signature to that second smart contract, effectively broadcasting both IOU signatures (i.e., the Entity-A signature and the $S_H$'s signature). Then the funds are released to Entity-A by the second smart contract. Note, the smart contract effects the transfer of ownership once the conditions for the IOU are satisfied. In embodiments of the present invention, the IOU functionality is implementable as a while within the same smart contract as a payment hub or is splittable across multiple smart contracts. The IOU is a signed message authorizing the update of a client's off-chain ledger during one of the rounds to include one or more additional transfers. This message is structure to contain the round number, the total sum received, the total sum sent, and a commitment to the set of transfers performed during that round. The transfers committed to include a unique randomly generated identifier, the amount, and the intended recipient information.

In an embodiment, in the absence of incoming payments, the $SC_H$'s behavior based on the $S_H$'s input should be verified and second, in the event of incoming transactions, the user/entity should request payment receipts from $S_H$.

To observe the $SC_H$'s behavior, a user of H should only be online once in an eon. The user can only request—once per eon—a proof of stake from $S_H$, and if disagreement occurs or no response is provided or no valid response is given for any reason, challenge $S_H$. If an eon is dimensioned to be one day, a user effectively only needs to be online once every 24 hours, and is not required to constantly monitor the payment hub's operation.

In an embodiment, to receive transactions, a user or entity must maintain an active or "on" online presence in order to sign transaction receipts, such that the sender can receive a receipt from online server $S_H$.

In an embodiment, by using trusted execution environments, the operations of the payment hub can be further secured. For example, if $SC_H$ is scheduled to only accept checkpoint $C_H^{eon}$ that are signed by an enclave whose public key is registered in $SC_H$ and whose code may only output correct state updates.

FIG. 3 shows an embodiment of the present invention in which there is an intuition underlying the performed steps 300 for transferring a payment from one user to another off-chain through the payment hub. Entity B 301 and Entity A 302 initially have a balance of 1 Ether each. Entity B 301 first sends an IOU 312 to Entity A 302 having 0.1 Ether. Entity B also provides the IOU 312 to pay for the transaction fee of 1% to the Liquidity.Network™ brand server 303 or overall system server. Once Entity A 302 receives the IOU 312 which was signed by the Liquidity.Network™ brand server or online server 303, Entity A 302 can effectively enforce the IOU. After the end of the eon, the Liquidity.Network™ brand server 303 creates and broadcasts a checkpoint 309, 313 which is validated and applied by the Liquidity.Network™ brand smart contract on-chain. Bob's and Alice's balances are then recomputed and available to withdraw.

Note, in various example embodiments, a server of the system is referred to as a Liquidity.Network™ brand server, and the system is referred to as a Liquidity.Network™ brand system. In embodiments, the Liquidity.Network™ brand server can be interchangeably a server. In embodiments, the Liquidity.Network™ brand system can be interchangeably a system.

Figure 4:
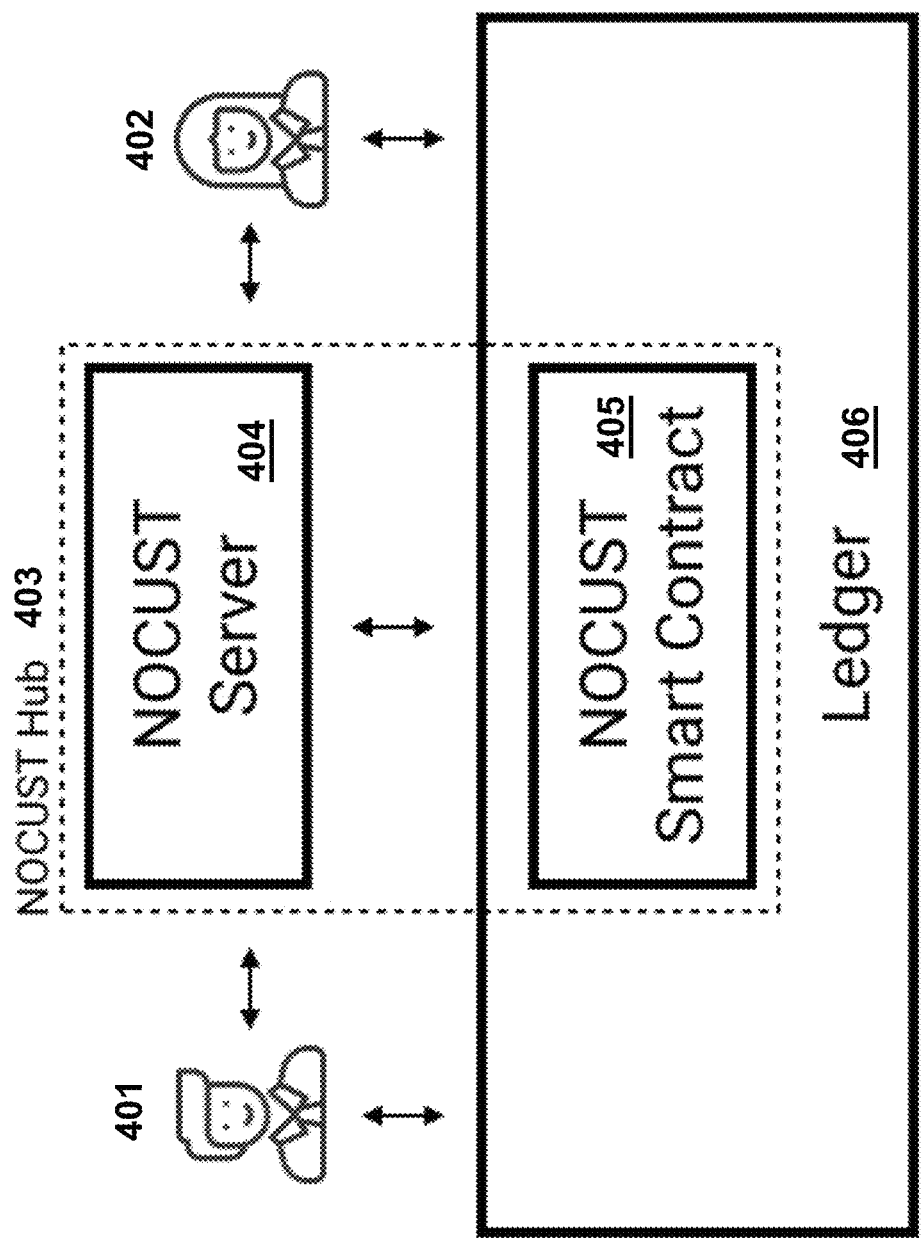
FIG. 4 shows an example embodiment of a system according to the present invention.

FIG. 4 shows an embodiment of a payment hub architecture. A digital ledger 406, e.g., a blockchain layer, that allows for the convenient deployment of tamper-proof smart contracts is provided. This layer represents an underlying root of trust and acts as the intermediary in case of disputes between the hub 403 and the user 401, 402.

In FIG. 4, under normal operation, a user 401 or 402 communicates with the hub server 403 to perform transactions towards other users 402 or 401, respectively. Under adversarial conditions, the user 401 or 402 resorts to the NOCUST™ brand smart contract 405 to perform a dispute process.

In FIG. 4, a user 401, 402 acts as a recipient and/or a payer of financial assets such as cryptocurrency coins or tokens which are transferred in the form of IOUs. In an embodiment, a user 401, 402 can convert assets between their on-chain and off-chain representation. As custodian, a user securely stores a private key to manage its assets and can initialize disputes of the NOCUST™ brand server 404 by communicating with the NOCUST™ brand smart contract 405. Such communicating can include issuing transactions to the NOCUST™ brand smart contract 405.

In FIG. 4, or other embodiments herein, a NOCUST™ brand payment hub 403 includes a NOCUST™ brand online server 404 and a NOCUST™ brand smart contract 405. The online server 404 acts as a communication intermediary between the users 401, 402. In an embodiment, the online server 404 is required by the NOCUST™ brand system to commit at regular time intervals a special digest of all off-chain accounts to the smart contract 405. The smart contract 405 acts as a supervisor of the NOCUST™ brand server and verifies its correct operation, accepting dispute initializations from users, and halting the operation of the NOCUST™ brand server in case of misbehavior.

Embodiments of the present invention, such as that described in FIG. 4, provide a novel centralized but untrusted hub, i.e., a "NOCUST™" branded payment hub, which acts as a non-custodial $2^{nd}$-layer scaling solution, providing a secure vehicle against adversaries attempting to double-spend off-chain assets and controlling a set of malicious users, the hub, or both. In an embodiment, a NOCUST™ brand structure has an N-party payment hub construction, based on a bimodal ledger commitment scheme to account for user balances. In using a NOCUST™ brand structure, funds allocated by an entity within a payment hub can be used to directly pay any other participant of that payment hub. This can significantly reduce the routing and network complexity of existing payment channel designs and associated collateral costs. In an embodiment, a centralized but untrusted hub can achieve instant finality by providing an estimated transaction volume of a time period as collateral. In an embodiment, the NOCUST™ brand structure allows for the payment hub's collateral to be managed efficiently within one on-chain transaction for all of its users. And, users of the payment hub can securely maintain custody of their funds, even in the absence of the payment hub's availability or under adversarial behavior by others. In contrast, a trusted payment hub either requires no locked up funds per additional user or a progressive amount of collateral, capped at the respective transaction volume of a disputable time window.

A smart contract is deployed to an on-chain digital ledger, which then creates the off-chain digital ledger. In an embodiment using a NOCUST™ brand structure, the underlying smart contract effectively acts as a means of efficient dispute resolution. In an embodiment of the off-chain payment hub structure of the present invention, a non-custodial financial intermediary can operate and achieve the same transaction throughput as traditional custodians. For example, a user or entity can open a payment channel directly with a NOCUST™ brand payment hub off-chain, thus alleviating the need for a costly on-chain channel initialization transaction. A NOCUST™ brand hub off-chain allows a set of participants/users to securely transact over a single payment hub, so that the allocated funds of those participants/users can be used freely among the participants of the single payment hub. Further, this structure of the NOCUST™ brand hub off-chain alleviates the burden on the off-chain network to route payments. In an embodiment, multiple NOCUST™ brand hubs can be interconnected, e.g., over traditional two-party payment channels with fairly static and long-lived peering agreements. In an embodiment, NOCUST™ brand hub off-chain allows for delayed finality after a determined time window. In an embodiment, NOCUST™ brand hub off-chain allows for instant finality in certain predetermined circumstances, e.g., if the NOCUST™ brand hub off-chain operator chooses to stake an amount of collateral. In an embodiment, the collateral can be an amount between zero and the transaction volume during a disputable time window as a trust model parameter, which can advantageously completely eliminate ephemeral counter-party risk.

In an embodiment, a NOCUST™ brand hub operator is essentially a centralized operator that coordinates and ratifies the execution of payments in a pool of collateral deposited into an on-chain smart contract. The access to this collateral pool is moderated by the smart contract, which operates expecting periodic receipt of commitment to the state of the off-chain digital ledger from the NOCUST™ brand hub operator. In an embodiment, the state of the off-chain digital ledger comprises each user's account in the collateral pool. The commitment is constructed to prove and verify that a user's off-chain account was updated correctly by the operator to the smart contract, such that withdrawals can be facilitated and deposits are secured.

In an embodiment, a NOCUST™ brand hub operator is only a single point of failure for availability. Such failure does not affect the custody of the funds or the integrity of the operation. This provides a significant advantage in terms of communication cost between the parties compared t decentralized ledger networks and payment channel networks. In an embodiment, the complete disappearance of a hub operator, or malicious attempts by the hub operator to double spend or to seize user funds, in a NOCUST™ brand system only leads to its halt. That is, such does not affect the ability of users to exit using the smart contract with their latest confirmed balance. And, despite adversarial or malfunctioning hub behavior, users do not lose custody of their digital assets.

Figure 5:
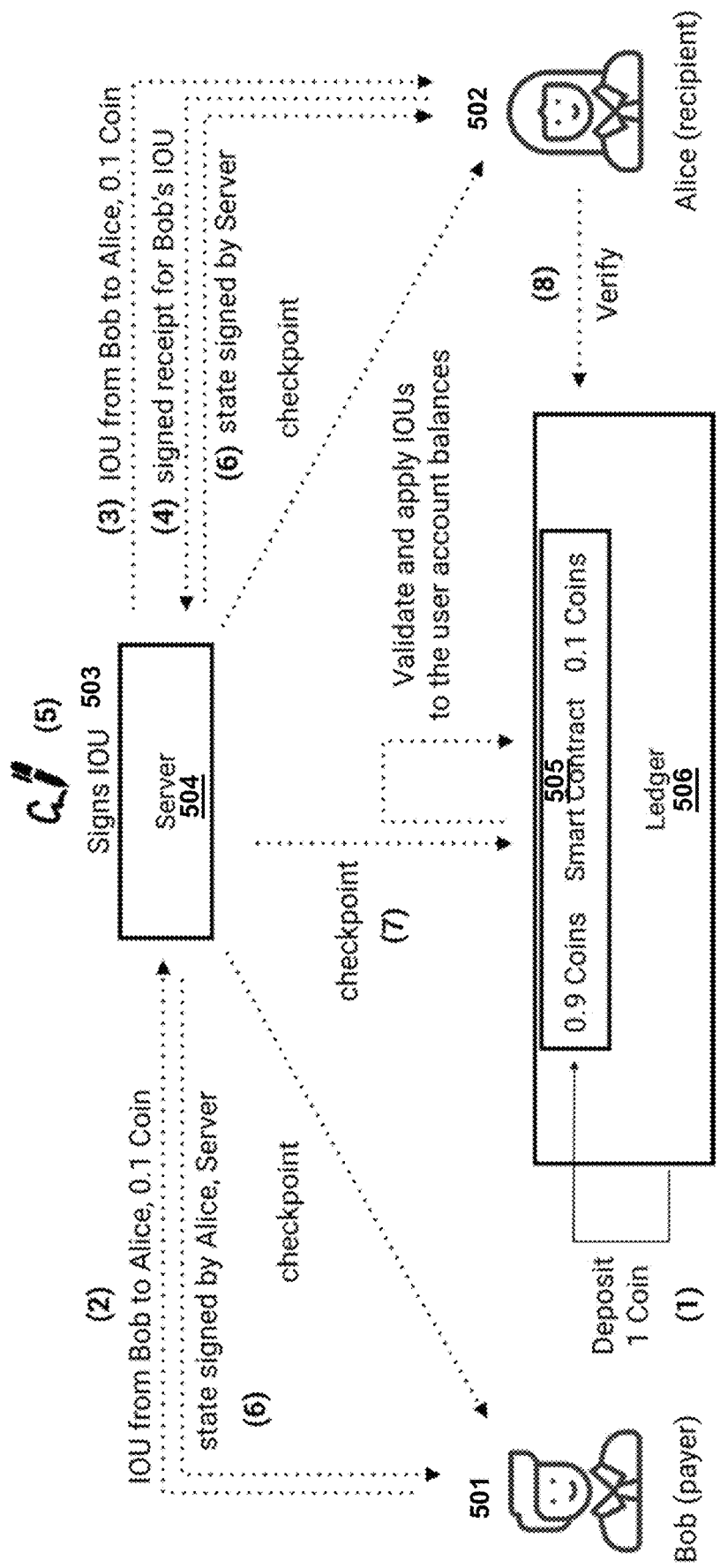
FIG. 5 shows an example embodiment of a system according to the present invention.

FIG. 5 shows an example embodiment of converting on-chain towards off-chain assets, transmitting a digital asset off-chain via an IOU from one user to another user, and committing and validating the aggregated IOU to the underlying blockchain. In an embodiment, a NOCUST™ brand hub operates in rounds, that is the operator server is required to submit periodic checkpoints to the smart contract. The checkpoint aggregates, within a constant sized message, all updated account states after applying the transactions that were performed off-chain.

At initialization of the NOCUST™ brand hub or when a new user joins, the following setup operations are performed: hub setup and user registration. In an embodiment, in hub setup, a hub is initiated by deploying the smart contract on-chain and by having the operator's server initialize the first genesis checkpoint on-chain. In an embodiment, in user registration, given its private key, a user signs a registration message and sends this message to the operator server. In an embodiment, a user registers off-chain with a NOCUST™ brand hub server, thus without an on-chain transaction costs.

In an embodiment, digital assets are converted between their on-chain and off-chain representations with an on-chain transaction. The smart contract enforces that the value of one unit of an on-chain asset is equal to one unit of the same off-chain asset. For example, in converting from on-chain to off-chain deposit, a payer, e.g., Bob (payer) 501 in FIG. 5, with one on-chain coin can convert that digital asset to an off-chain representation by depositing this amount into the smart contract 505. For example, in converting from off-chain withdraw to on-chain, a user initiates a withdrawal with the smart contract. The withdrawal request functions without support of the NOCUST™ brand server, hence is non-collaborative.

Figure 6:
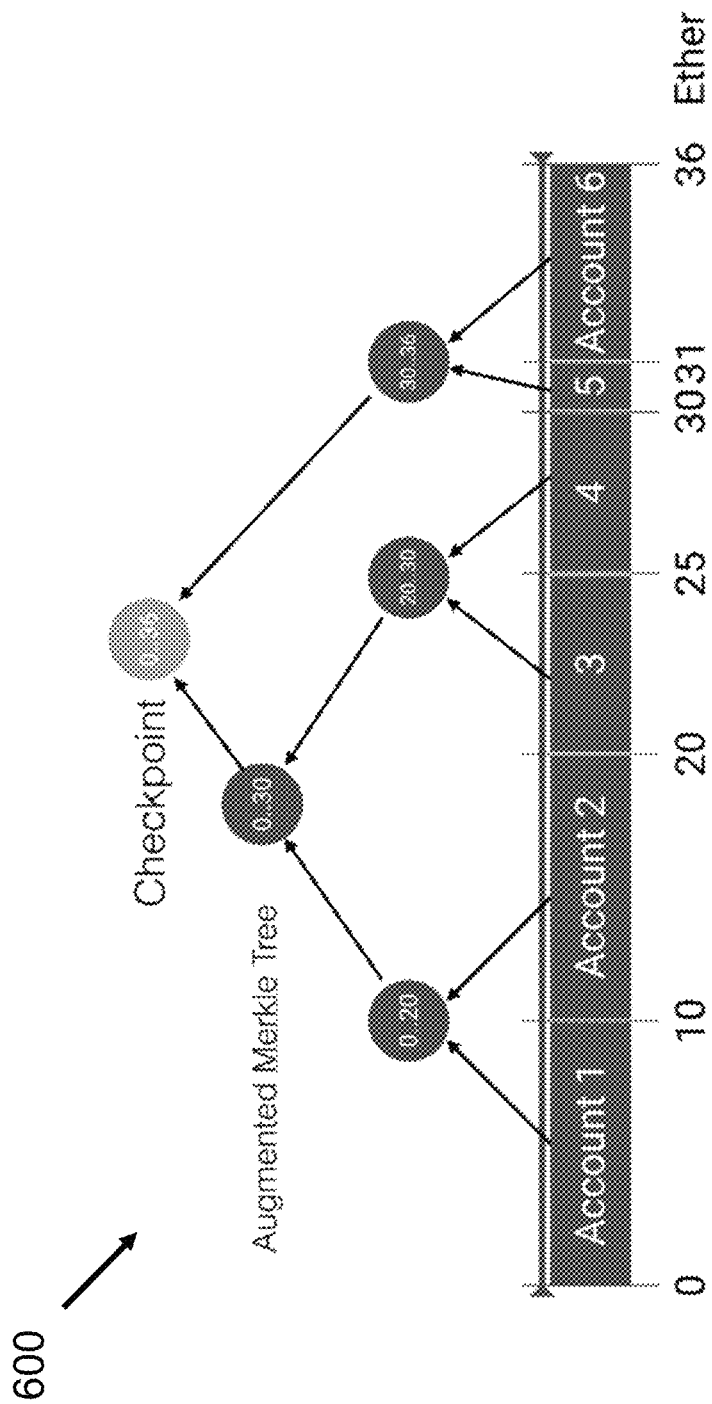
FIG. 6 shows an example embodiment of a system according to the present invention.

In an embodiment, off-chain assets are represented and managed within a bimodal ledger structure which separates the individual user account balances in exclusive interval allotments. Each account occupies an exclusive and non-intersecting interval. In FIG. 6, a bimodal ledger structure representing the off-chain assets 600 is shown. In FIG. 6, there are six accounts with their respective off-chain balance. The total amount of off-chain assets is 36 Ether worth of cryptocurrency. In an embodiment, each account occupies an exclusive and non-intersecting interval. Account 1, in FIG. 6, for example, owns the interval 0 to 10, representing 10 Ether. The total amount of off-chain Ether that is managed by a NOCUST™ brand hub is the sum of all intervals, i.e., 36 Ether. The bimodal ledger structure is compressed within an augmented Merkle tree, and the Merkle root is committed at regular time intervals to the NOCUST™ brand smart contract, together with the total amount of funds managed by the NOCUST™ brand hub. Every internal node is annotated with the continuous interval its two children occupy. The data structure allows for a straightforward verification that the sum of all accounts in the tree match the actual on-chain balance of the smart contract. Therefore, double spends become obvious and fractional reserve scenarios are effectively not possible.

FIG. 5, a high-level flow of operation of a NOCUST™ brand hub server is shown. In this embodiment, the recipient 502 and the payer 501 are already connected to the NOCUST™ brand hub server 504. In FIG. 5, the payer 501 deposits on-chain 505 to create off-chain assets, and then authorizes a debit from its account towards the intended recipient. The payer 501 forwards the signed state update and IOU 503 to NOCUST™ brand server 504. The NOCUST™ brand server 504 notifies the recipient 502 of the incoming transfer. The recipient 502 approves the state update to their account. The server 504 signs both updated states and gives its respective signatures to both users 501, 502. The NOCUST™ brand server 504 submits at regular checkpoint intervals the aggregated user off-chain balances to the NOCUST™ brand smart contract 505 associated with the ledger 506. The users 501, 502 observe the checkpoint submissions and verify once in every checkpoint interval the correct behavior of the NOCUST™ brand server 504. The users 501, 502 issue a dispute towards the smart contract 505 if correctness was not provable.

Figure 7:
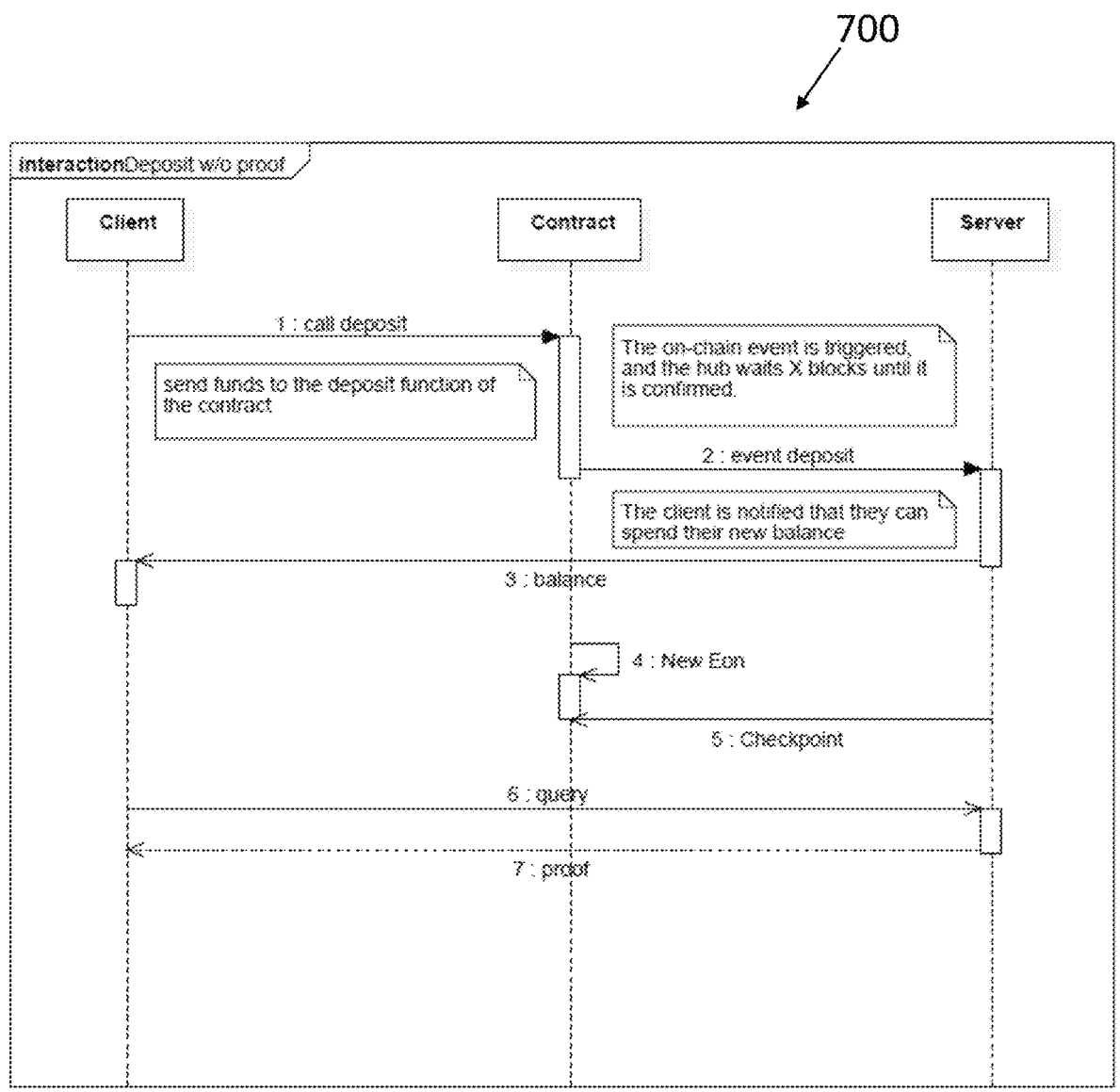
FIG. 7 shows an example embodiment of a system involving a deposit without a proof of stake according to the present invention.

In FIG. 7, an example embodiment of a system is shown involving a deposit without a previous Proof of Stake 700. Before being able to send funds in the Liquidity.Network™ brand system, a user is required to provide funds as a deposit to the smart contract $SC_H$ of a Liquidity.Network™ brand payment hub H, or receive funds from another user already in possession of funds within the network, to attain a spendable balance. If a user interacts with $SC_H$ for the first time, the user does not have access yet to any previous proof of stake for H. Note, that throughout this application, user and entity are used interchangeably. The system can function with computers and predefined parameters and/or learning algorithms and parameters.

In FIG. 7, a user deposit funds and then receives a proof of stake. In FIG. 7, for example, the user first initiates an on-chain transaction which targets the deposit function of $SC_H$ that the user aims to deposit to. This transaction triggers a traditional on-chain event and $SC_H$ then waits for X block confirmations/eras of the underlying blockchain. Once the deposit has been confirmed, a deposit event is triggered to the corresponding server $S_H$ of smart contract $SC_H$, or the server recognizes the change in the smart contract balance manually by inspection of the on-chain state data without a specialized event emission mechanism or otherwise.

The online server $S_H$ then notifies the client about the new balance being available within the payment hub H. In case of first deposit, the user may start off-chain transactions immediately after hub confirmation. Effectively, there is no apparent delay in using a newly funded electronic wallet.

In an embodiment, a user is not permitted to start transactions without proof when the user has a proof from the previous eon and the system must first ensure that the state update in the new eon is fair and appropriate before using it.

In an embodiment, after the commitment of a new checking $C_H^{eon}$ which account for the new deposit of the user, the user can query the server $S_H$ to receive a proof of stake.

Figure 8:
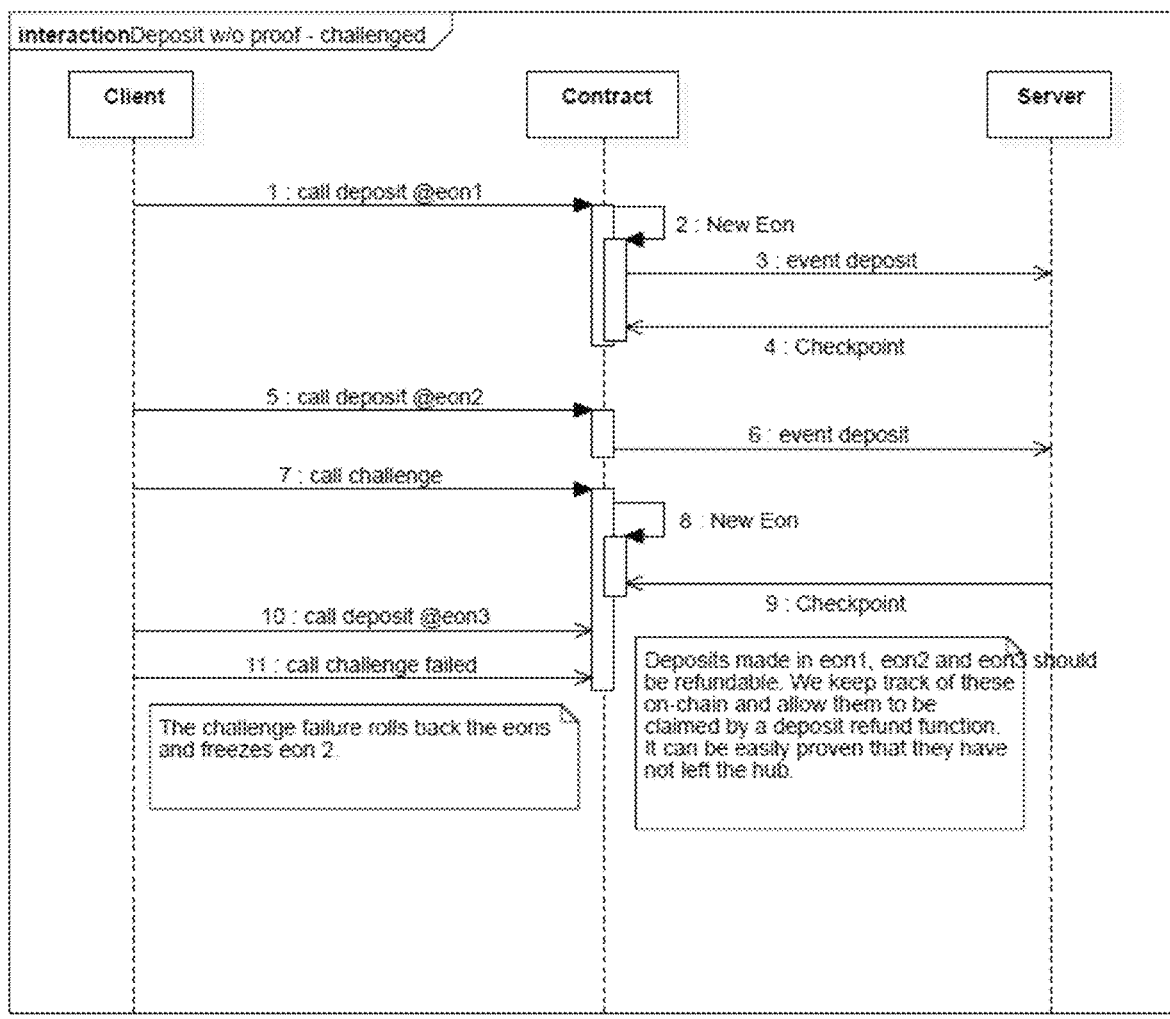
FIG. 8 shows an example embodiment of a system involving a deposit without a previous proof of stake and a challenge of the payment hub according to the present invention.

In an embodiment, FIG. 7 assumed no payment hub misbehavior, and no challenges towards the payment hub were issued. In FIG. 8, a case is described where the payment hub $S_H$ misbehaves and is challenged by the user.

In FIG. 8, a user first calls the deposit function of the payment hub's smart contract in eon 1. The user effectively performs an on-chain transaction to store funds in smart contract $SC_H$. After $S_H$ receives a notification of deposit, $S_H$ notifies the user of a new balance record (step 3).

After a certain time passes, the $S_H$ provides a malicious checkpoint $C_H^{eon}$ to the payment hubs smart contract $SC_H$. The user notices that the checkpoint does not account for the user's deposit in eon 1.

At a later time within eon 2, the user provides another deposit. The second deposit is credited in smart contract $SC_H$ and the user is notified about a new incoming balance from $S_H$. In step 7, the user challenges the hub due to the malicious checkpoint.

The challenge would require $S_H$ to prove that the stake from the user's deposit of round 1 was properly accredited. It is assumed that $S_H$ intentionally does not reply to the client within the required timeout period (which is smaller than a eon time), with the hope to enforce the malicious checkpoint.

The third eon is triggered and $S_H$ submits a new checkpoint in step 9, still ignoring the challenge of the client. The client then can choose to deposit an additional deposit in round 3, still waiting for $S_H$ to respond to the challenge.

In step 11, the challenge times out and the payment hub's smart contract $SC_H$ seizes operation, because the payment hub server $S_H$ misbehaved by not responding to the client's challenge. The challenge failure has severe implications for the hub and the users of the hub, namely:

Eon 1, 2 and 3 are rolled back. That means that all off-chain transactions that have happened within those eons will be invalidated. In an embodiment, the hub is frozen at eon 2, meaning that only proof of stakes of eon 1 are allowed to withdraw funds. In an embodiment, all deposits made in eon 1, 2 and 3 are refundable and can be claimed by the user through smart contract $SC_H$.

In an embodiment, if a user submits multiple deposits in a particular eon, these deposits are all aggregated into a single lump sum which is accredited in the next checkpoint. Such aggregation provides better efficiency and does not constitute a security risk. In an embodiment, if a user submits multiple deposits in a particular eon, these deposits are not aggregated into a single lump sum, and instead are each individually accredited in the next checkpoint.

Figure 9:
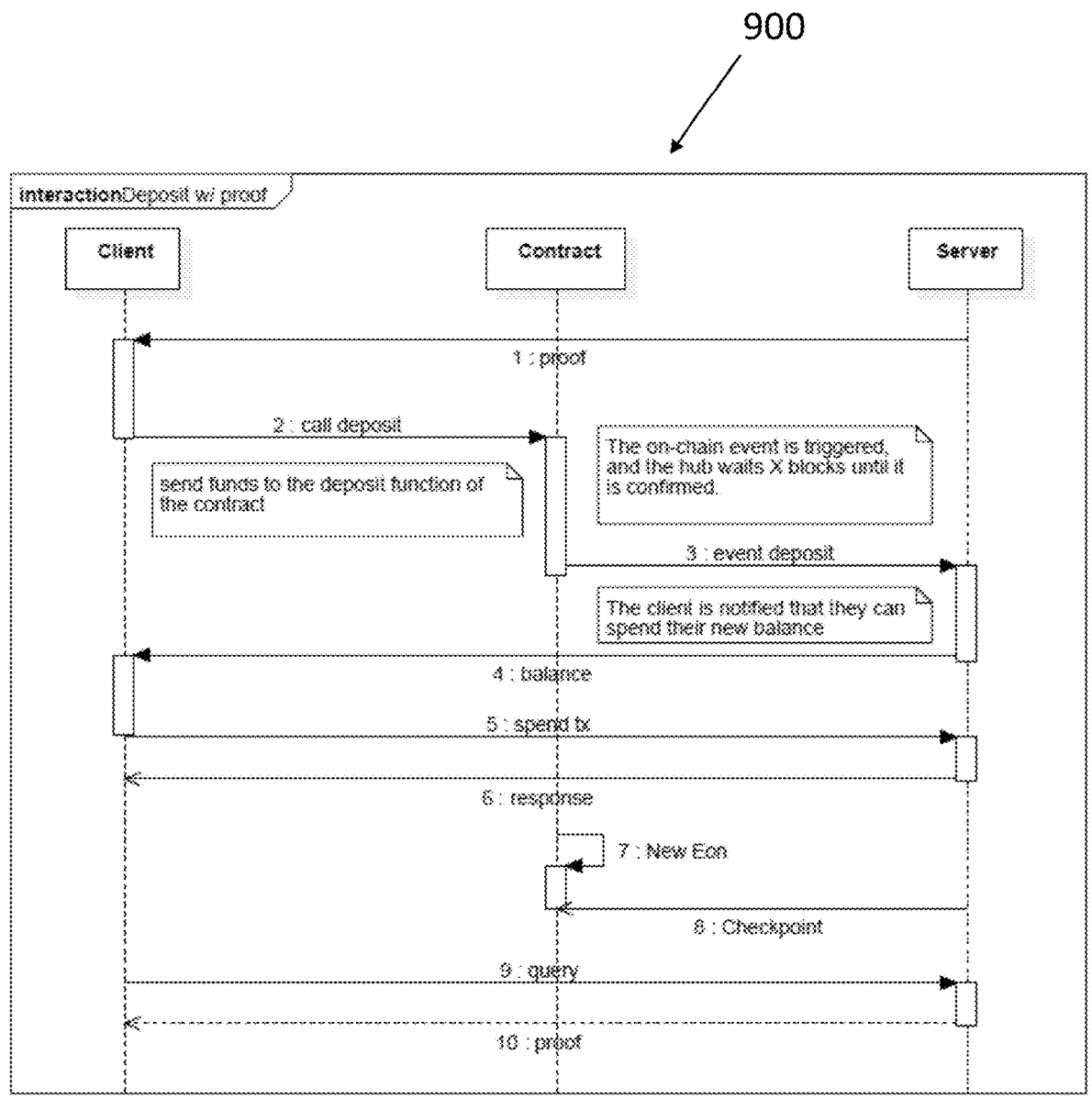
FIG. 9 shows an example embodiment of a system involving a deposit with a previous proof of stake and a challenge of the payment hub according to the present invention.

In an embodiment where there is a deposit without an existing proof of stake, if a user already previously performed a deposit, the user has access to a previous proof of stake and can query $S_H$ for such proof. FIG. 9 shows the case where the user previously acquired a proof of stake and then performs a deposit with subsequent off-chain transactions over $S_H$. Similar to the previous case, the user calls the deposit function of smart contract $SC_H$ to provide additional funds to be used in H. After X block confirmations/eras, the deposit event is triggered from smart contract $SC_H$ to the online server $S_H$. At that point, the user is notified about a new balance being available within the payment hub H.

The user can send allocated funds by sending a transaction to $S_H$, which is relayed to the recipient. Once the recipient signs the reception of the transaction towards $S_H$, $S_H$ notifies the user about the success of the transaction.

Once a new eon initiates (e.g., step 7 in FIG. 9), online server $S_H$ provides a new $C_H^{eon}$ accounting for the user's previous deposit and balance updates due to performed transactions.

Figure 10:
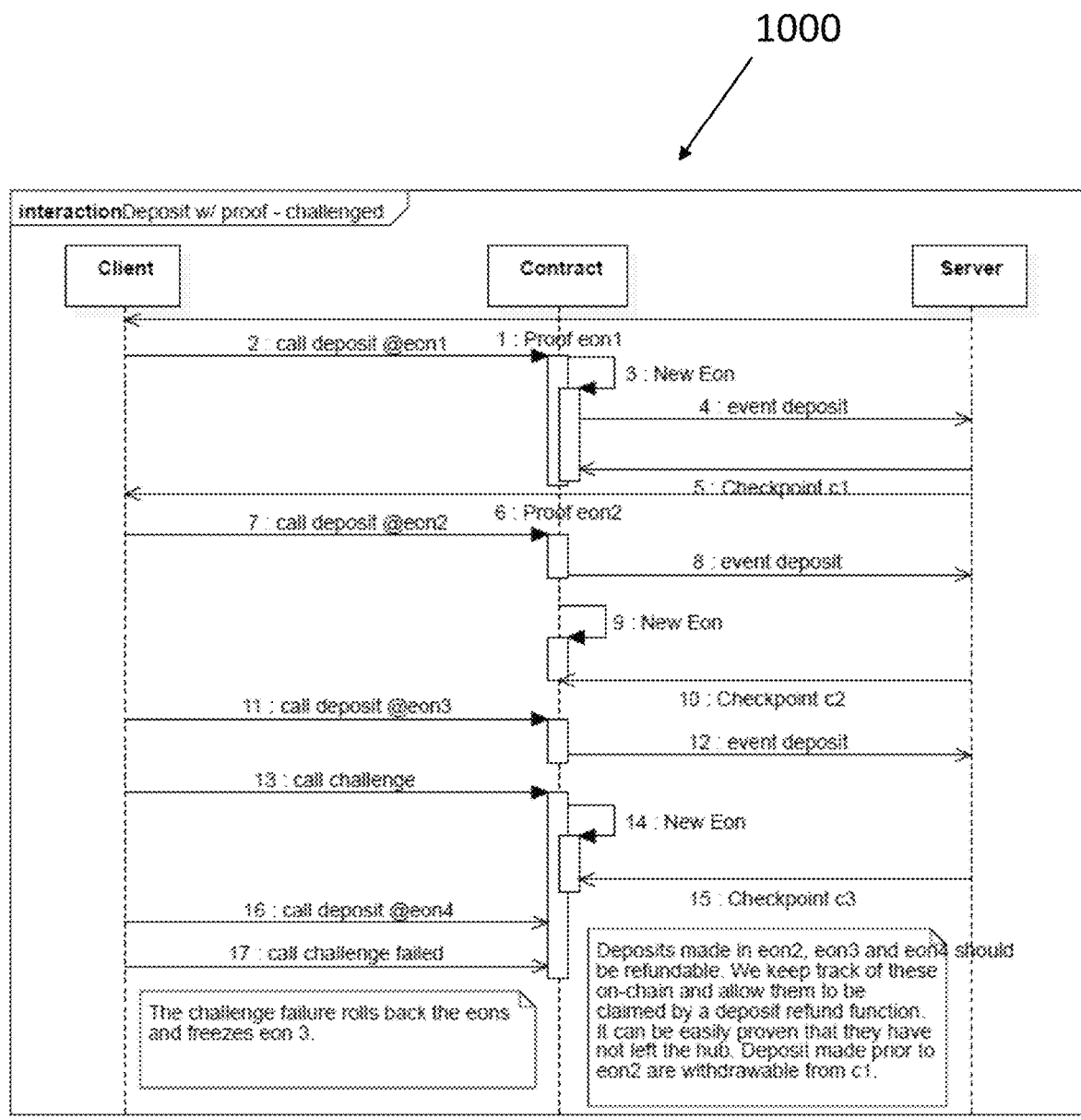
FIG. 10 shows an example embodiment of a system involving a deposit with a previous proof of stake and a challenge of the payment hub according to the present invention.

In FIG. 8, an embodiment 800 of the present invention involving a deposit without previous proof of stake and challenge the hub is shown. In this embodiment, a user queries $S_H$ to receive the current proof of stake. In FIG. 9, an embodiment 900 of the present invention involving a deposit with a previous proof of stake is shown. In FIG. 10, an embodiment 1000 of the present invention involving a deposit with an existing proof of stake and a challenge is shown. In FIG. 10, the user previously acquired a proof of stake and then performs off-chain transactions over the payment hub. In an embodiment, proofs of stake are acquired from the users from the payment hub operator. This can be effected through direct off-chain communication with the payment hub operator or in another manner. The verification of the correctness of a proof of stake is effected through verifying the proof of stake against the submitted checkpoint according to the construction rules of the specialized merkle tree.

In FIG. 10, an embodiment of the present invention is shown in which the payment hub misbehaves, and the user challenges the hub successfully.

In an embodiment, assuming a user has previously deposited funds within smart contract $SC_H$, the user has access to a proof of stake at H. The user can withdraw funds from the payment hub (see, e.g., FIG. 11) by calling the withdraw function of the smart contract. With the withdrawal call, the user is required to provide the latest proof of stake. In an embodiment, with the withdrawal call, the user is required to provide the latest proof of stake and the highest spendings of the previous eon. In an embodiment, the amount requested for withdrawal must not exceed the current user balance.

Figure 11:
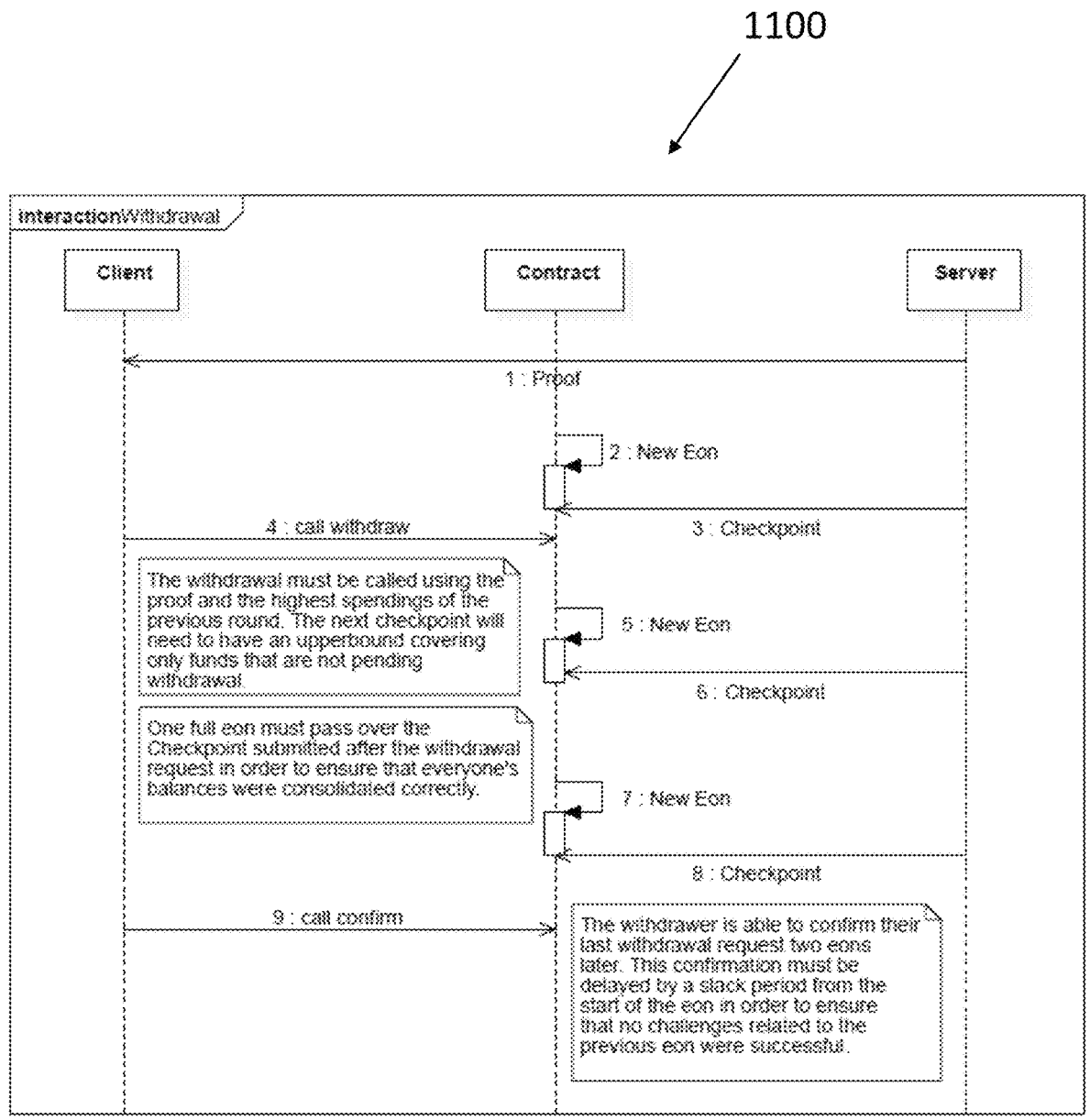
FIG. 11 shows an example embodiment of a system involving a withdrawal from the payment hub according to the present invention.

FIG. 11 shows an embodiment of the present invention of withdrawal of funds from the smart contract payment hub. In an embodiment, after the call for withdrawal, and the current eon elapsed, $S_H$ issues a new checkpoint. This checkpoint's upper bound is required to cover only funds which are currently not pending. The system can be set to require at least one full eon to pass after this first checkpoint following the withdrawal call, such that it can be ensured that everyone's balances were consolidated correctly.

In an embodiment 1100, two eons after the withdrawal request, the user is allowed to confirm the withdraw call, but not before a slack period after the second eon started (after step 7). That is to ensure that no challenges related to the previous eon were successful. Specifically, the user is spending allocated funds via off-chain transactions in step 2 of FIG. 11, which are later consolidated within a checkpoint in step 4. In step 5, however, the user attempts to call the withdrawal function while claiming that no spendings occurred (the user tries to double-spend). The payment hub server $S_H$ can then slash the withdrawal of the client, because $S_H$ has access to the signed off-chain transactions of the user.

Figure 12:
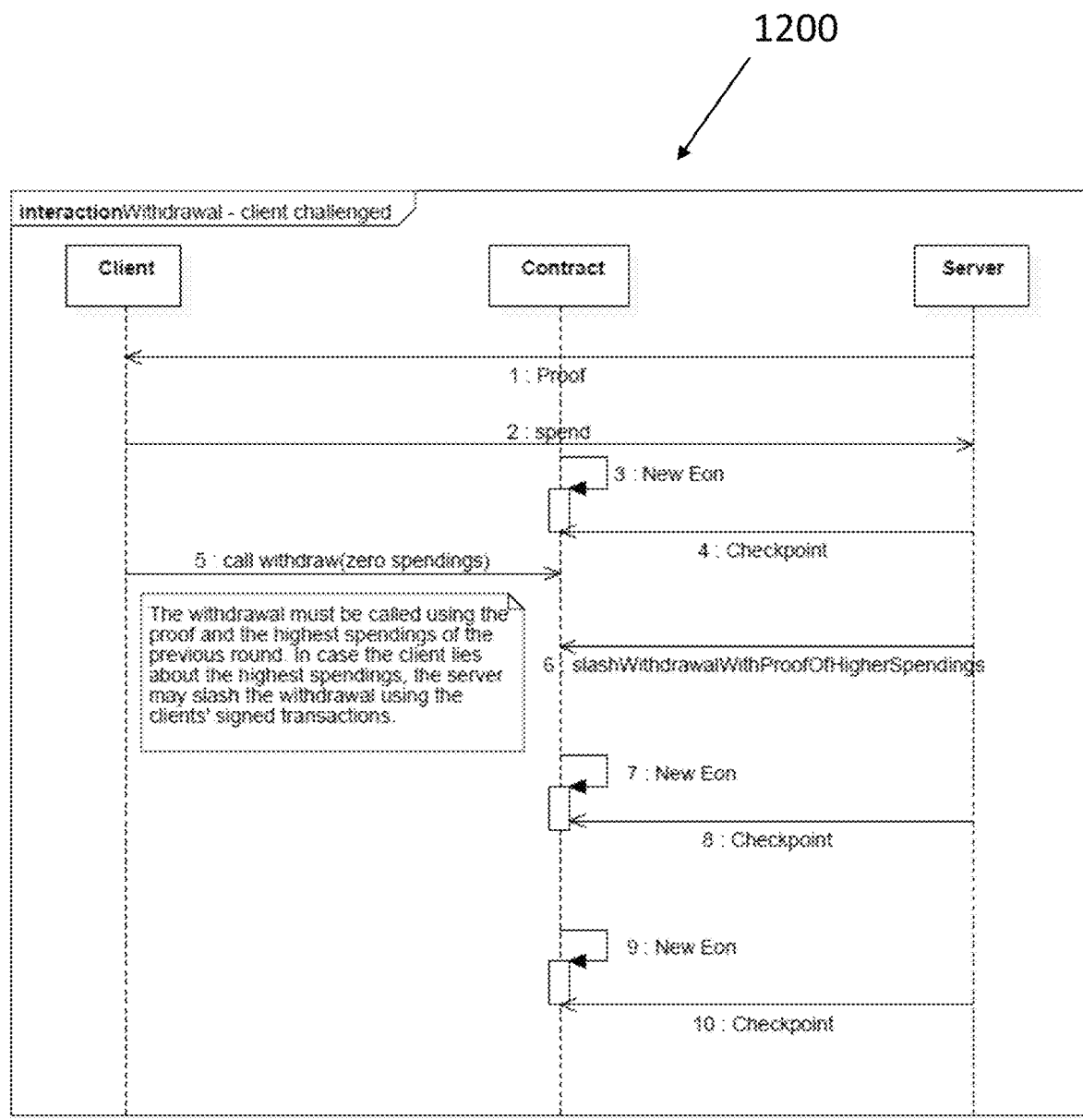
FIG. 12 shows an example embodiment of a system involving a withdrawal from the payment hub and a client is challenged according to the present invention.

In FIG. 12, an embodiment 1200 of the present invention is provided where there is a withdrawal of funds from the smart contract payment hub and the user is challenged. In this case, it is assumed that the user attempts to withdraw funds to which the user is not entitled.

Figure 13:
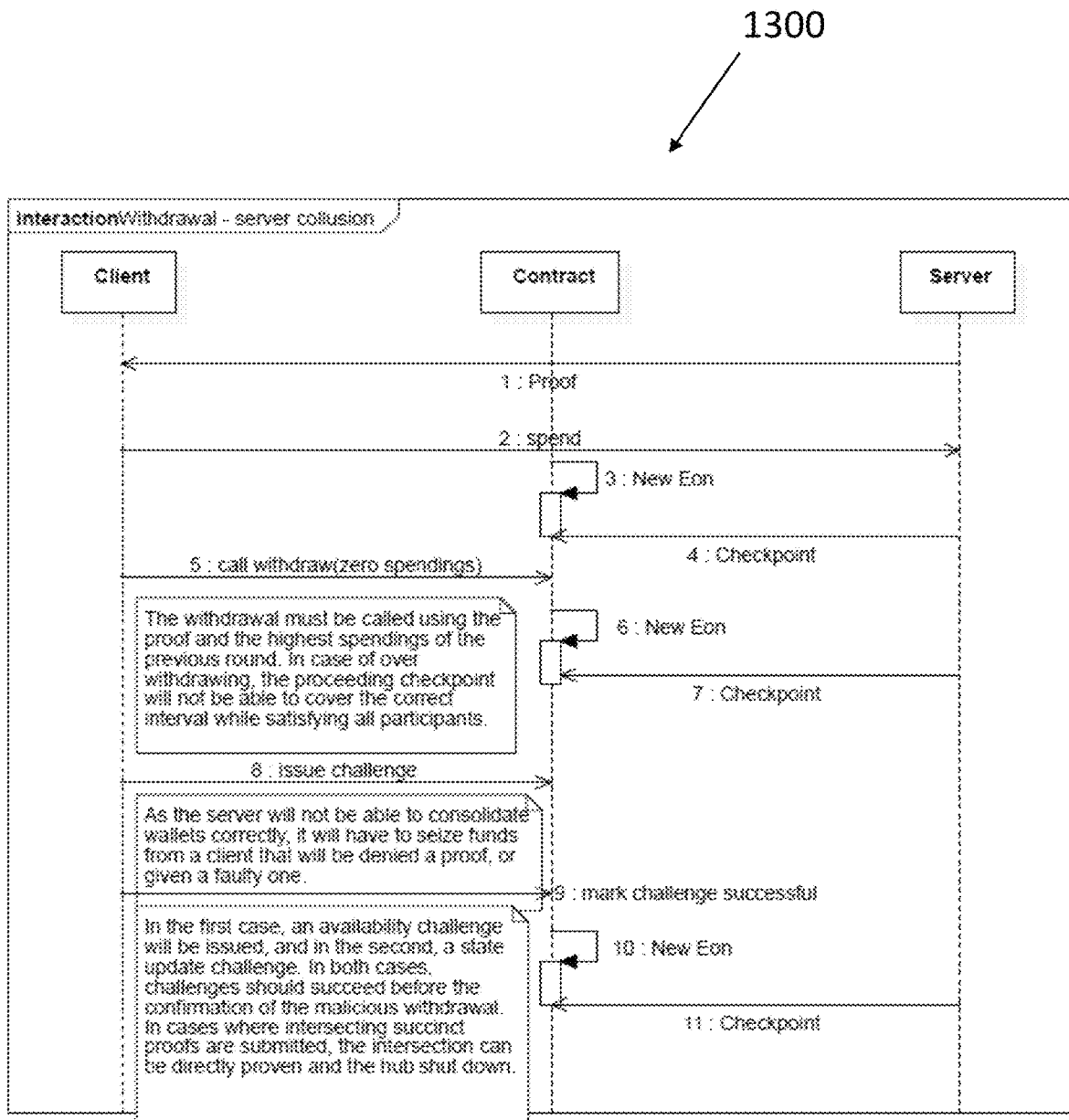
FIG. 13 shows an example embodiment of a system involving a withdrawal from the payment hub with server collusion according to the present invention.
Figure 14:
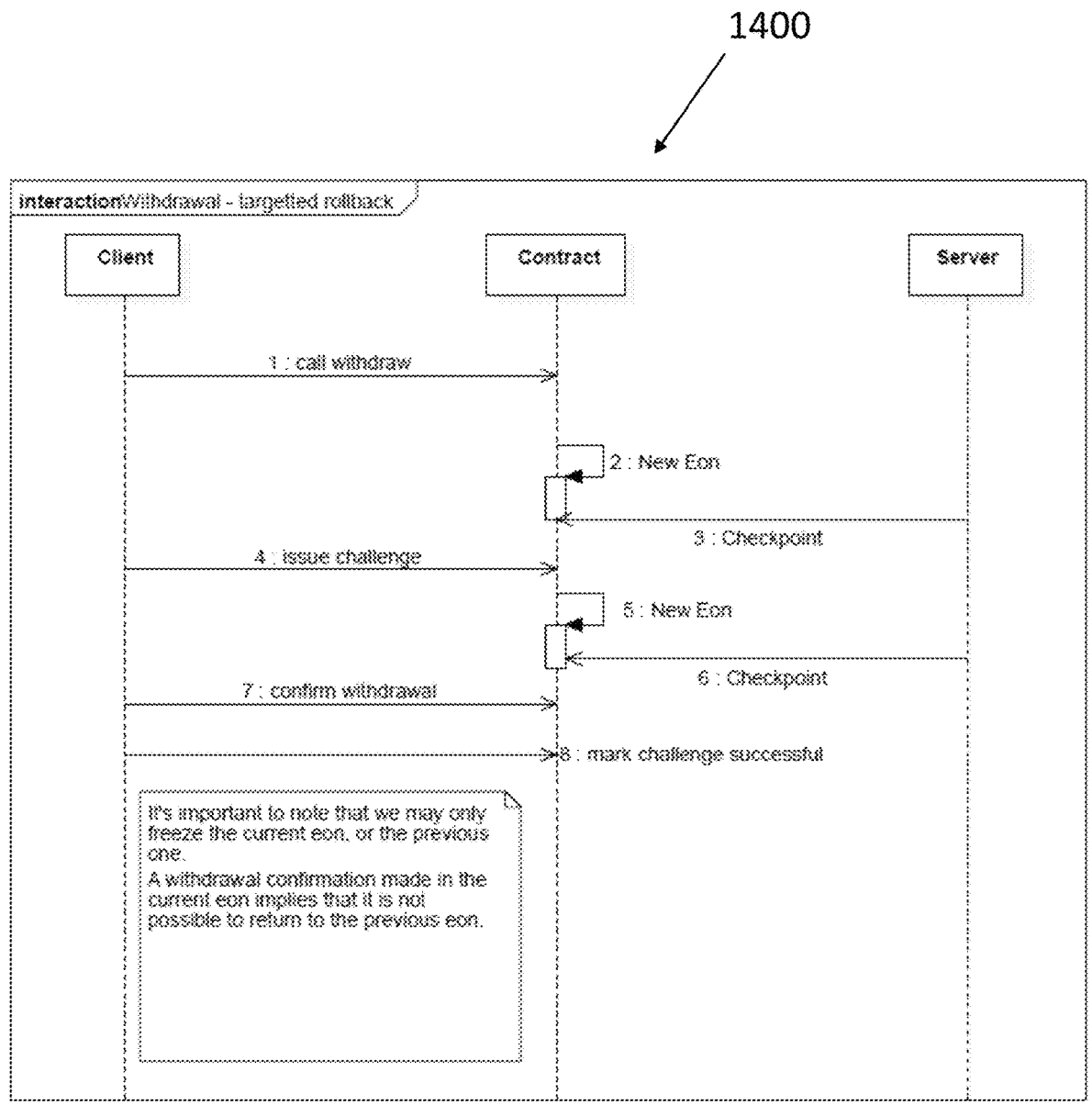
FIG. 14 shows an example embodiment of a system involving a withdrawal from the payment hub and targeted rollback according to the present invention.

In FIG. 13, an embodiment 1300 of the present invention is provided where a user wishes to withdraw and a server collusion occurs. FIG. 13 withdraw funds from the hub, server collusion In FIG. 14, an embodiment 1400 of the present invention is provided where a user wishes to withdraw and the payment hub tries to intentionally rollback by one round. In an embodiment, a user can register and be notified of a time tick.

In an embodiment, decentralized blockchain ledgers relying on miners to process transactions incentivize those miners with a reward for their contributions towards advancing the state of the global ledger. In an embodiment of the present invention, a protocol has been developed to significantly increase the scalability and usability of off-chain payment networks. See, e.g., the Drawings. Embodiments of the present invention can be adapted to any decentralized ledger environment that allows the execution of Turing complete smart contracts (or hard codes the present invention's components into the respective blockchain).

Embodiments of this invention include, but are not limited to, constructs that employ the aforementioned commitment scheme to prove and verify the integrity of their operations. This commitment scheme can be used to construct cryptographically verifiable data, referred to in this document as "proof of stake" or "proof of exclusive allotment", that ensure that the record of an account's balance is distinguishable from the balances of other records such that no two accounts may claim to have been allocated the same set of funds in a pool of funds. The commitment scheme may also be used to prove that all the transactions that were recorded to be performed in an account were authorized by its owner, and that the corresponding updates, deductions or credits, to the account's balance were correctly applied per the authorization.

Embodiments of this invention may leverage the introduced commitment scheme to provide cryptographic proofs of the occurrence, or the authorization, of an operation or transaction by an account holder, to provide additional functionalities that rely on the provability of the occurrence or authorization of operations or transactions.

Embodiments of this invention may include additional data pertaining to an account's record and also include it in the aforementioned commitment record to provide further functionality.

The modifications listed herein and other modifications can be made by those in the art without departing from the ambit of the invention. Although the invention has been described above with reference to specific embodiments, the invention is not limited to the above embodiments and the specific configurations shown in the drawings. For example, some components shown can be combined with each other as one embodiment, and/or a component can be divided into several subcomponents, and/or any other known or available component can be added. The operation processes are also not limited to those shown in the examples. Those skilled in the art will appreciate that the invention can be implemented in other ways without departing from the substantive features of the invention. The present embodiments are therefore to be considered in all respects as illustrative and not restrictive. Other embodiments can be utilized and derived therefrom, such that structural and logical substitutions and changes can be made without departing from the scope of this disclosure. This Specification, therefore, is not to be taken in a limiting sense, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations and/or variations of various embodiments. Combinations of the above embodiments, and other embodiments not specifically described herein, will be apparent to those of ordinary skill in the art upon reviewing the above description.

What is claimed is:

1. A method for secure off-chain digital transactions, comprising:
    deploying a smart contract from an originating source to an on-chain ledger associated with a first payment hub server and instantiating a first off-chain ledger;
    authorizing at least one user to interact with the first payment hub server;
    synchronize periodically a balance sheet of the first off-chain ledger with the smart contract using a cryptographic commitment structure;
    wherein the smart contract is used to authorize a withdrawal from the first off-chain ledger.

2. The method of claim 1, wherein an off-chain transaction is enacted, an associated transaction authorization is signed and sent to the payment hub server directly.

3. The method of claim 1, further comprising authorizing a blockchain payment address for a deposit.

4. The method of claim 3, further comprising, if interacting directly with the payment hub server, obtaining blockchain payment address and submitting information to the smart contract to commence a withdrawal, wherein the information is proof of sufficient balance to cover the amount indicated in the transaction.

5. The method of claim 1, wherein the deploying of the smart contract is effected as a broadcast.

6. The method of claim 1, wherein the smart contract includes a signature of an originator.

7. The method of claim 2, further comprising upon completion of the transaction, including each signed authorization on the smart contract.

8. The method of claim 1, wherein the cryptographic commitment structure is employed to provide secure proofs of correct transaction enactment and balance updates.

9. The method of claim 8, wherein the secure proofs that the hub is operating correctly are provided from generation of a resulting transcript by the cryptographic commitment structure.

10. The method of claim 1, further comprising at least another payment hub server, the first payment hub server and the at least another payment hub server being interconnected over a payment channel.

11. The method of claim 10, wherein the first payment hub server and the at least another payment hub server are interconnected by at least one of: (i) an interlinking allowing the respective hubs to rebalance respective funds off-chain; and (ii) the first payment hub server is interconnected directly with the at least another payment hub server such that the first payment hub server acts as a user of the at least one other payment hub server.

12. A system of transferring a payment off-chain between a first entity and a second entity, comprising:
    the first entity having cryptocurrency on a blockchain;
    at least one payment hub server;
    wherein:
        the first entity deposits cryptocurrency in a smart contract,
        the first entity creates an IOU for a determined amount of cryptocurrency from the first entity to the second entity,
        the first entity transmits the IOU to an online server $S_H$,
        the online server $S_H$ forwards the IOU to the second entity,
        the second entity authorizes the receipt of the IOU by providing its authorization signature to the online server $S_H$, and
        the online server $S_H$ cryptographically signs the IOU and the receipt authorization from the second entity and provides the signed IOU and receipt authorization to the first and second entities.

13. The system of claim 12, wherein the online server $S_H$ provides the signed IOU and receipt authorization by at least one of: (i) transmitting the signed IOU and receipt authorization to the first and second entities, (ii) allowing at least one of the first and second entities to access at least one of the signed IOU and receipt authorization, and (iii) allowing at least one of the first and second entities to pull the signed IOU and receipt authorization from the online server $S_H$.

14. The system of claim 12, wherein the first or second entity provides an additional IOU to the online server $S_H$ paying an administrative fee:
    IOU(entity, payment hub, administrative fee).

15. The system of claim 12, wherein the unit of cryptocurrency is at least one of: Ether, Bitcoin, Zcash, XRP, Ada, Litecoin, Bitcoin Cash, NEM, Monero, Tron, Dfinity, Cardano, Thundercore, and an alternative cryptocurrency which supports at least one of smart contracts and smart contract-like programmable functionality.

16. The system of claim 12, wherein the at least one payment hub server is a network of payment hub servers.

17. The system of claim 12, wherein the depositing of a unit of cryptocurrency allows the first entity to send the respective unit to a participating entity of the at least one payment hub server, and allows the second entity to send the respective another unit to one of the participating entity and another participating entity of the at least one payment hub server.

18. The system of claim 12, wherein at the end of a periodic eon, the online server $S_H$ broadcasts a checkpoint $C_H^{eon}$ which aggregates all respective account balances of all participating entities, including the first entity and the second entity, which have transacted over the online server $S_H$, wherein the periodic eon is a repeating time interval associated with the payment hub.

19. The method of claim 18, wherein the smart contract receives, validates and applies the broadcasted checkpoint $C_H^{eon}$ to the account balances on-chain.

20. The system of claim 19, wherein a third payment hub is comprised of online server $S_H$ and the smart contract, causing creation of a new Merkle interval tree $T_H^{eon}$, wherein nodes of the new Merkle tree are augmented with additional information to store account balances.

21. The system of claim 20, wherein Merkle proofs from the new Merkle interval tree can be provided to the smart contract to prove exclusive ownership of the account balances by a respective entity.

22. The system of claim 21, wherein a trusted execution environment enhances the security of the first payment hub.

23. The system of claim 21, wherein the enhancement of the security of the first payment hub is effected by causing the smart contract to only accept a checkpoint $C_H^{eon}$ that is provided by the trusted execution environment.

24. The system of claim 22, wherein a user can withdraw funds from the payment hub instantly, where instantly means an amount of time less than an eon.

25. A system of allowing a first entity to withdraw from a smart contract, comprising:
- the first entity having cryptocurrency on a blockchain;
- a payment hub, the payment hub having an online server and is associated with a smart contract based on the blockchain; wherein:
  - the first entity deposits cryptocurrency in the smart contract,
  - the first entity creates an IOU for a determined amount of cryptocurrency without signature,
  - the first entity submits the IOU to an online server and requests a signature from the online server,
  - the first entity receives the IOU having the signature of the online server and submits the IOU having the signature of the online server to a second smart contract associated with a separate collateral pool,
  - the second smart contract then reserves funds for withdrawal in the determined amount of cryptocurrency for a predetermined time,
  - the first entity signs the IOU having the signature of the online server and submits the signed IOU to the second smart contract, and
  - the second smart contract effects transfer of ownership of the determined amount of cryptocurrency when conditions for the signed IOU are satisfied.

26. The system of claim 25, wherein the signed IOU is a signed message authorizing an update of an off-chain ledger of the first entity during a transfer round,
- wherein the signed message includes a transfer round identification, total sum of funds received, total sum of funds sent, and a commitment to a set of transfers performed during the transfer round, and
- wherein a respective transfer includes a unique randomly generated identifier, an amount, and an intended recipient information.

27. The system of claim 25, further comprising: if the second smart contract does not transfer ownership of the determined amount of cryptocurrency, then the first entity submits a request for a proof of stake from the online server.

28. The system of claim 27, wherein if the online server is nonresponsive, the first entity submits a challenge to the online server.

29. The system of claim 25, further comprising: if the second smart contract does not transfer ownership of the determined amount of cryptocurrency, then the first entity submits a request to the online server for a payment receipt.

30. The system of claim 25, wherein the first entity must maintain an active online presence to be authorized to sign and receive receipt.

* * * * *